US011849091B2

(12) United States Patent
Watariuchi

(10) Patent No.: US 11,849,091 B2
(45) Date of Patent: Dec. 19, 2023

(54) INFORMATION PROCESSING APPARATUS, INFORMATION PROCESSING SYSTEM, AND METHOD FOR INFORMATION PROCESSING APPARATUS

(71) Applicant: CANON KABUSHIKI KAISHA, Tokyo (JP)

(72) Inventor: Satoki Watariuchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/936,768

(22) Filed: Sep. 29, 2022

(65) Prior Publication Data

US 2023/0096341 A1 Mar. 30, 2023

(30) Foreign Application Priority Data

Sep. 30, 2021 (JP) ................................. 2021-161001

(51) Int. Cl.
*H04N 1/00* (2006.01)
*H04N 1/44* (2006.01)

(52) U.S. Cl.
CPC ..... *H04N 1/00917* (2013.01); *H04N 1/00204* (2013.01); *H04N 1/00408* (2013.01); *H04N 1/00477* (2013.01); *H04N 1/4413* (2013.01); *H04N 2201/0072* (2013.01); *H04N 2201/0094* (2013.01); *H04N 2201/0096* (2013.01)

(58) Field of Classification Search
USPC ....... 340/906–929; 358/1.1–3.29, 1.11–1.18; 705/418; 714/37–55; 715/736–745
See application file for complete search history.

(56) References Cited

U.S. PATENT DOCUMENTS

| | | | |
|---|---|---|---|
| 2005/0223324 A1* | 10/2005 | Tashiro | G03G 15/502 715/273 |
| 2006/0171734 A1* | 8/2006 | Maeda | G03G 15/5016 399/81 |
| 2006/0187480 A1 | 8/2006 | Tsuchiya et al. | |
| 2012/0212777 A1 | 8/2012 | Honda | |
| 2015/0242167 A1* | 8/2015 | Yamaguchi | G06F 3/1238 358/1.14 |
| 2016/0352948 A1* | 12/2016 | Ono | H04N 1/00411 |
| 2018/0373480 A1* | 12/2018 | Tsuji | H04N 1/00798 |
| 2020/0195803 A1 | 6/2020 | Kobayashi | |
| 2020/0195811 A1* | 6/2020 | Otake | G10L 17/22 |

FOREIGN PATENT DOCUMENTS

| | | |
|---|---|---|
| JP | 3517183 B2 | 4/2004 |
| JP | 2006221427 A | 8/2006 |
| JP | 2016049731 A | 4/2016 |

OTHER PUBLICATIONS

Takenaka Yoko, Image Forming Apparatus And Control Method Thereof, Nov. 21, 2019 (Year: 2019).*
Philips; "Why does my Philips TV automatically switch off after four hours?"; Philips Support; Published on Dec. 29, 2016.

* cited by examiner

*Primary Examiner* — Marcellus J Augustin
(74) *Attorney, Agent, or Firm* — Canon U.S.A., Inc. IP Division

(57) ABSTRACT

A configuration is provided in which in a case where a user operation is performed on an image forming apparatus or a data processing apparatus while the image forming apparatus and the data processing apparatus are operating in cooperation with each other, the automatic clearing timers of both the apparatuses are reset.

19 Claims, 22 Drawing Sheets

| Request type (601) | Cooperation state for acceptance (602) | User-operation-causing request (603) |
|---|---|---|
| 611 — Job execution request | (Not in cooperation) | YES |
| 612 — Cooperation state obtaining request | (In cooperation) | NO |
| 613 — Original-document placing request | "Waiting for an original document to be placed" | YES |
| 614 — Unlock-with-PIN request | "PIN code request" | YES |
| 615 — Cancel request | Other than "cancel" | YES |

| Cooperation state (651) | Occurring event (652) | Changed cooperation state (653) |
|---|---|---|
| 661 — (Not in cooperation) | — | — |
| 662 — Waiting for an original document to be placed | "Scanner: an original document placed", "UI: the placing completed button pressed" | PIN code request |
| 663 — | "UI: the cancel button pressed" | Cancel |
| 664 — PIN code request | "Scanner: no original document placed" | Waiting for an original document to be placed |
| 665 — | "UI: the cancel button pressed" | Cancel |
| 666 — Job execution | — | — |
| 667 — Cancel | — | — |

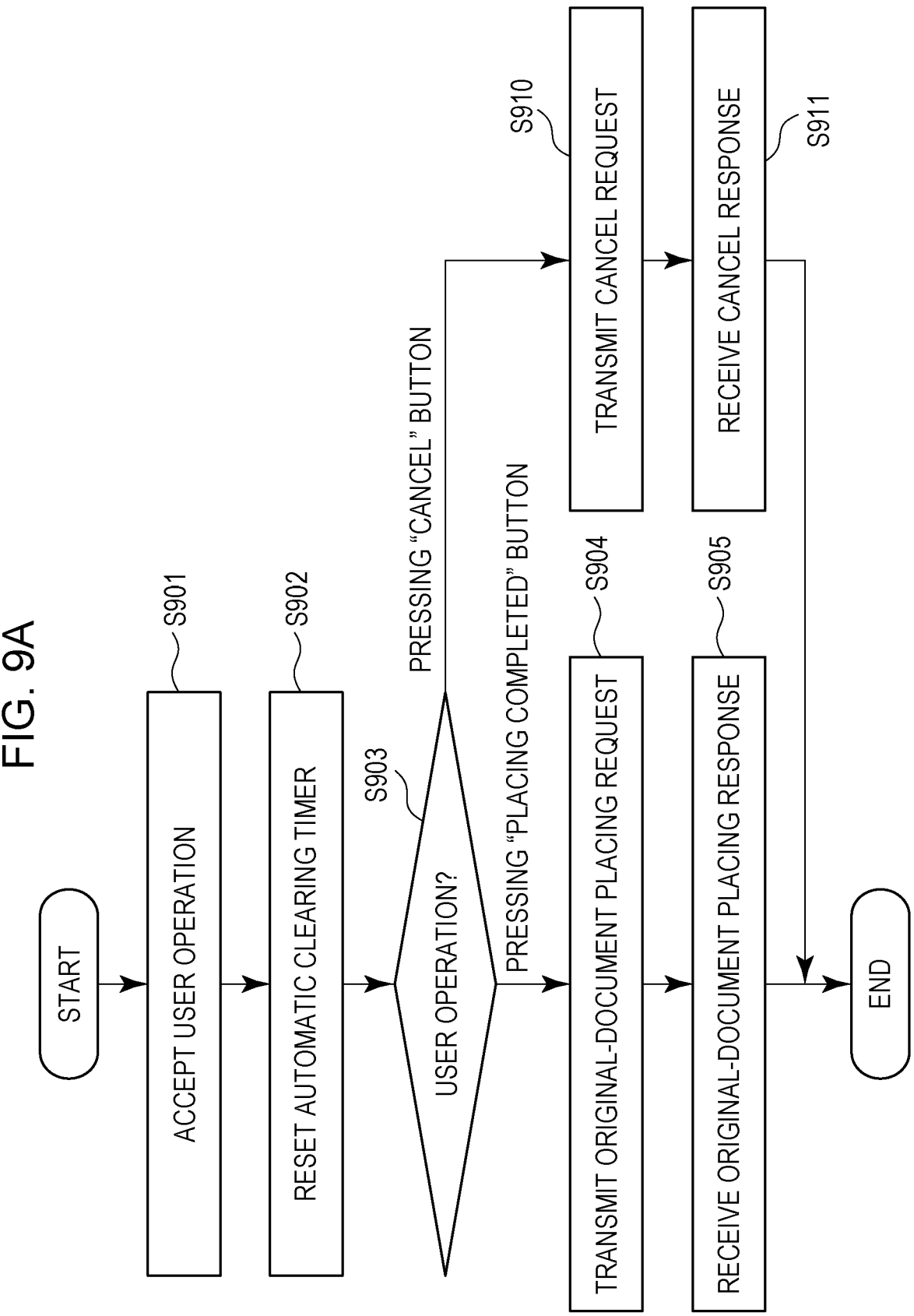

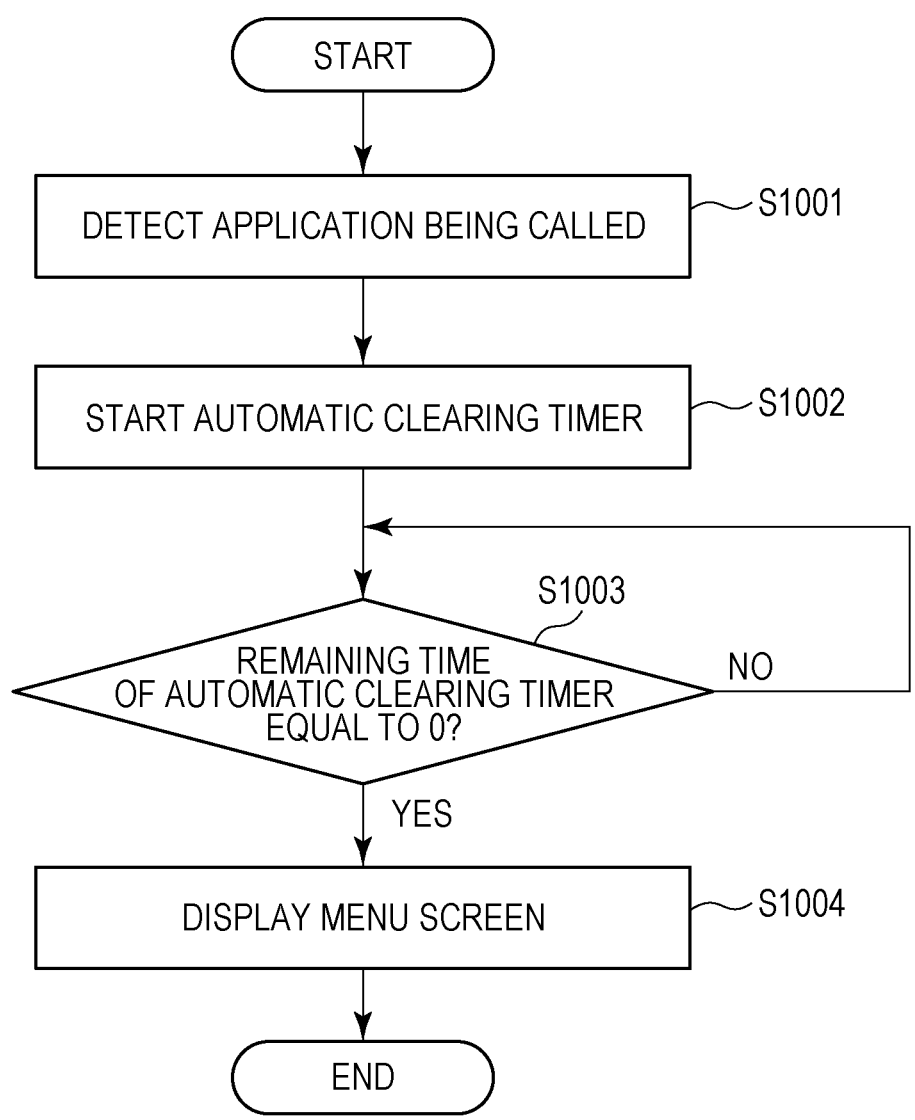

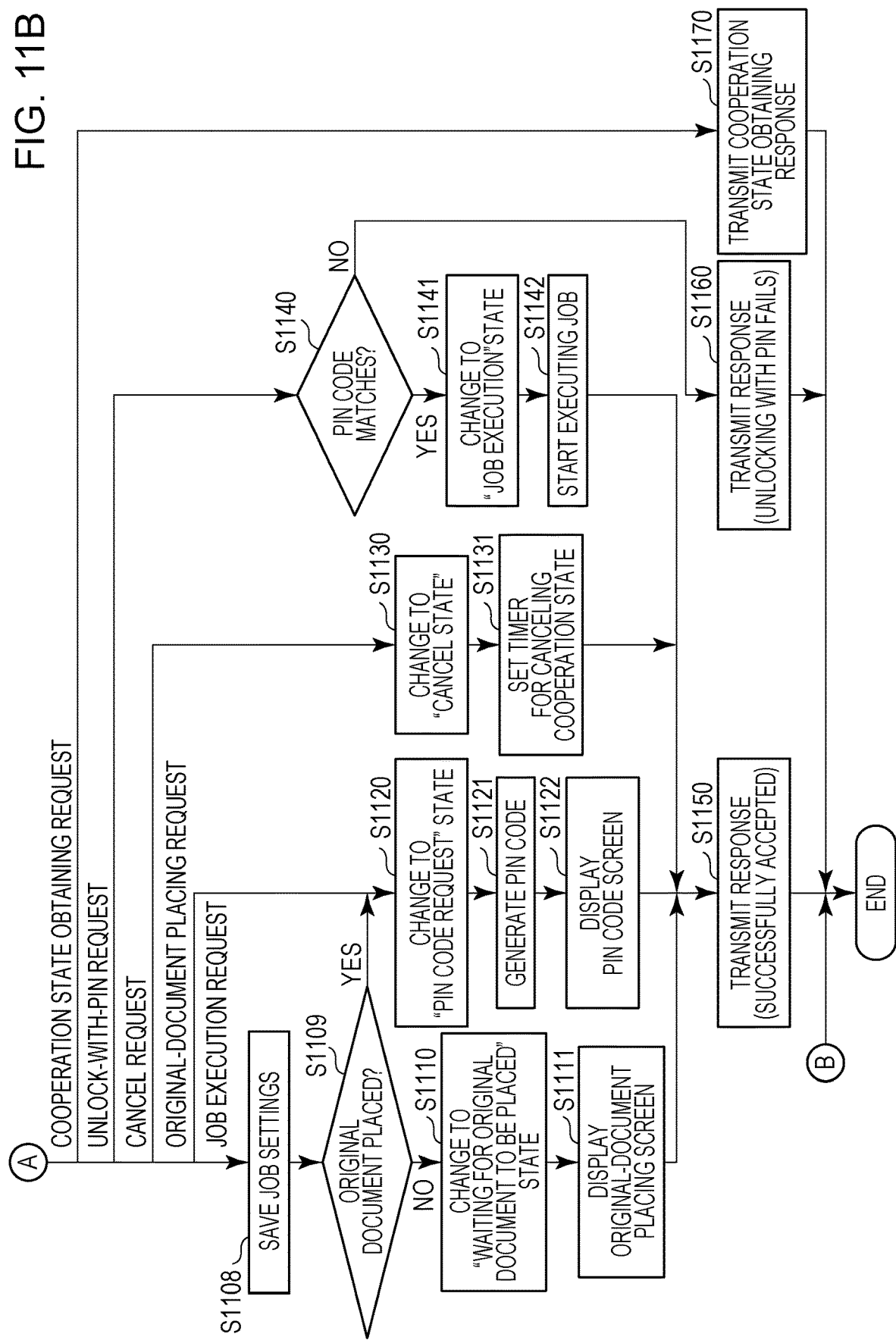

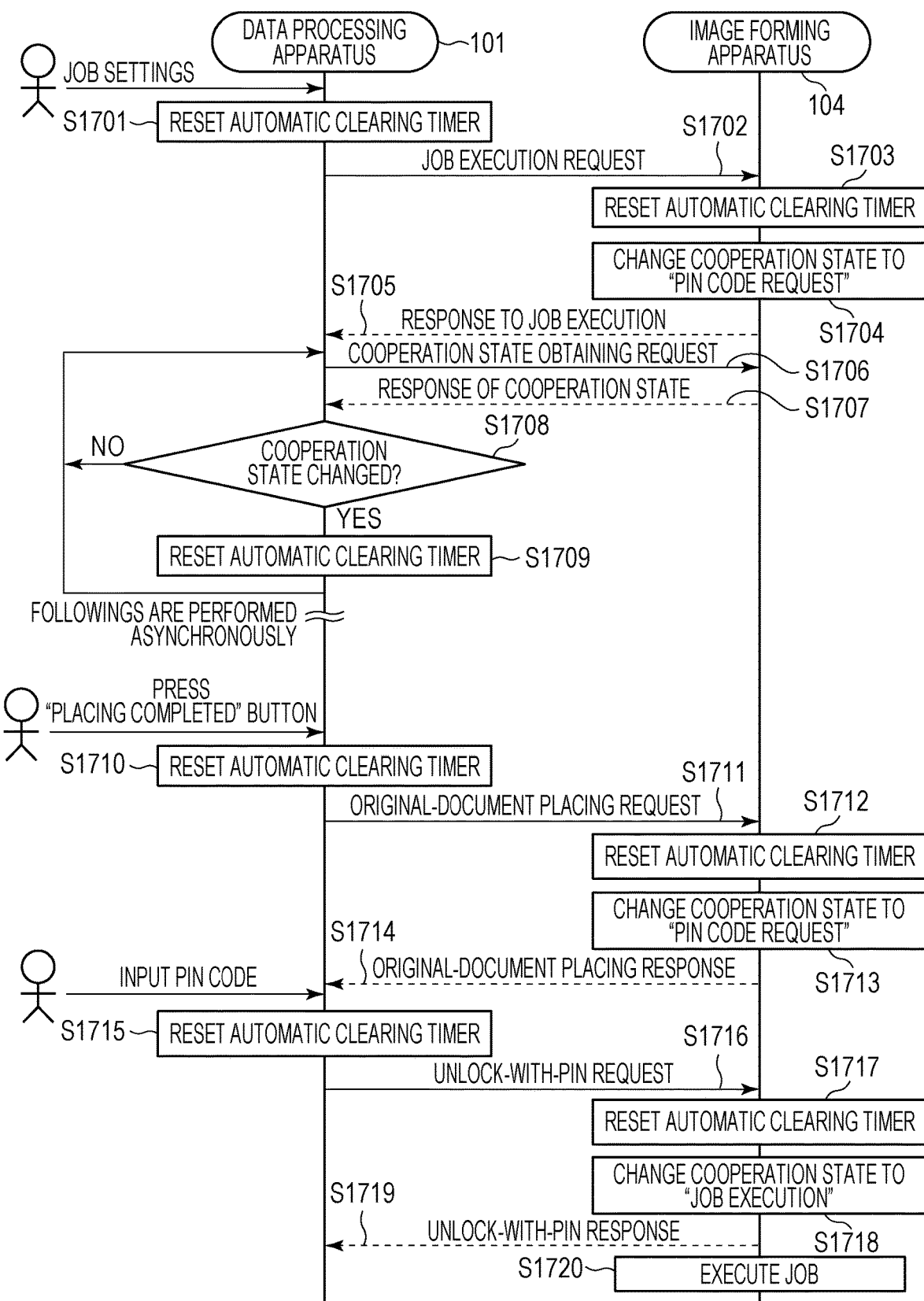

United States Patent (US 11,849,091 B2)

INFORMATION PROCESSING APPARATUS, INFORMATION PROCESSING SYSTEM, AND METHOD FOR INFORMATION PROCESSING APPARATUS

BACKGROUND OF THE INVENTION

Field of the Invention

The present invention relates to an information processing system in which apparatuses cooperate with each other to thereby execute a job.

Description of the Related Art

With the recent widespread use of high-performance mobile terminals called smartphones, applications for using an image forming apparatus from such mobile terminals have been provided. For example, to execute a function of transmitting a scanned original document to a specified destination, an image forming apparatus connected to a local area network (LAN) is searched for, and a job to which the email address of the destination and information about various scan settings (for example, color and double-sided) set by the user are added is generated. The generated job is transmitted to the image forming apparatus that has been found and that has a transmission function to thereby allow the mobile terminal to instruct the image forming apparatus to perform a series of processes necessary for transmission. At this time, network communication between the mobile terminal and the image forming apparatus is established in accordance with a communication protocol, such as Transmission Control Protocol/Internet Protocol (TCP/IP), Near Field Communication (NFC), or Bluetooth (registered trademark), and can be implemented with a publicly known technique.

A recent information processing apparatus, such as an image forming apparatus, has a function of clearing the set values of settings, restoring the display screen to an initial screen, or logging out in a case where no user operation on an operation unit is performed for a specific time. The function of restoring the apparatus to the initial state in a case where no operation is accepted for a specific time is defined as an automatic clearing function. Japanese Patent No. 3517183 proposes an image forming apparatus that can set the time (hereinafter referred to as "automatic clearing time") until the automatic clearing function is executed, on an operation mode by operation mode basis.

In a case where an information processing apparatus is operated while the information processing apparatus and a terminal are made to cooperate with each other, there is a problem that automatic clearing not intended by the user may occur, resulting in decreased usability. For example, a case is assumed where a job is transmitted from the terminal to the information processing apparatus and various processes necessary for executing the job are performed by operating the terminal. The user operates an operation unit of the terminal but does not operate an operation unit of the information processing apparatus, and therefore, an automatic clearing process is performed in the information processing apparatus after a predetermined time elapsed.

SUMMARY OF THE INVENTION

The present invention provides a method for allowing an automatic clearing process to be appropriately performed even in a case where an information processing apparatus and a terminal are made to cooperate with each other.

The present invention provides an information processing apparatus configured to be capable of communicating with a terminal, the information processing apparatus including an operation unit, the information processing apparatus including: a counting unit configured to count a time during which no user operation on the operation unit is accepted; a performing unit configured to perform an automatic clearing process in a case where a predetermined time is counted by the counting unit; and a resetting unit configured to reset the time counted by the counting unit in response to a predetermined request received from the terminal.

Further features of the present invention will become apparent from the following description of embodiments with reference to the attached drawings.

BRIEF DESCRIPTION OF THE DRAWINGS

FIGS. 6A and 6B illustrate an example of a cooperation management table of the image forming apparatus in a first embodiment.

FIGS. 9A and 9B are flowcharts illustrating processes performed by the data processing apparatus in the first embodiment.

FIG. 10 is a flowchart illustrating a process performed by the data processing apparatus in the first embodiment.

FIGS. 11A and 11B illustrate a flowchart illustrating a process performed by the image forming apparatus in the first embodiment.

FIG. 17 is a sequence chart illustrating a process performed by the image forming apparatus and the data processing apparatus in the first embodiment.

DESCRIPTION OF THE EMBODIMENTS

Hereinafter, embodiments of the present invention will be described with reference to the drawings. Note that configurations described in the embodiments are examples and are not intended to limit the scope of the present invention to the configurations. Although a description will be given below under the assumption that an image forming apparatus is an example of the information processing apparatus, the information processing apparatus is not limited to this.

First Embodiment

Figure 1:
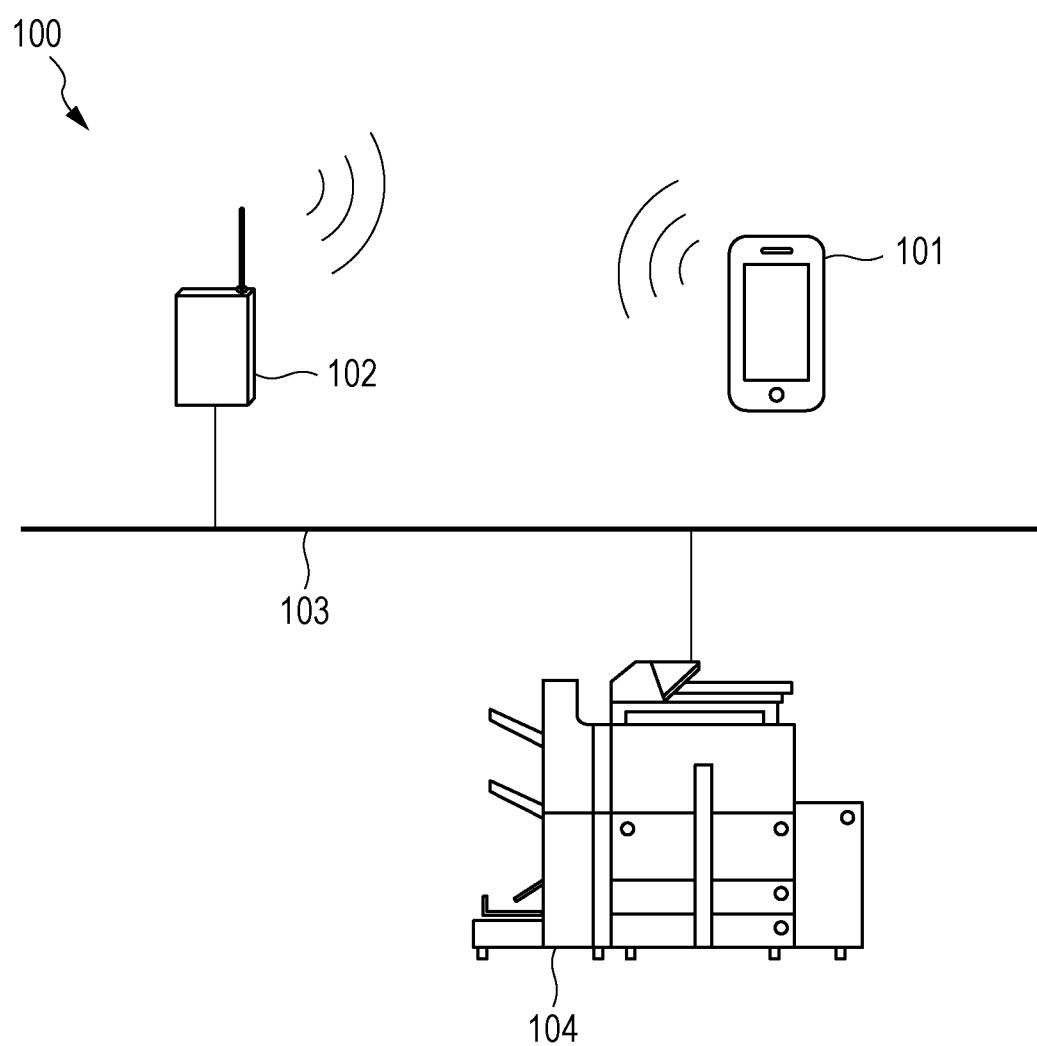
FIG. 1 is a diagram illustrating a configuration of an information processing system.

FIG. 1 is a diagram illustrating a configuration of an information processing system according to this embodiment. An information processing system 100 includes a data processing apparatus 101, a wireless LAN terminal 102, and an image forming apparatus 104, and these apparatuses are connected to each other over a network 103, which is, for example, a LAN. To the network 103, an apparatus other than those illustrated in FIG. 1 may be connected.

The data processing apparatus 101 is, for example, a mobile terminal, such as a smartphone, or may be an information processing apparatus on which an operating system for small terminals and programs for controlling voice calls, position detection, and data communication run. Alternatively, the data processing apparatus 101 may be a personal computer (PC) that does not have functions of voice call control, position detection control, and so on. The data processing apparatus 101 is connected to the network 103 via the wireless LAN terminal 102.

The wireless LAN terminal 102 is a wireless LAN base unit having a typical network router function and provides a wireless LAN, for example, at home or in an office.

The image forming apparatus 104 is a multifunction peripheral (MFP) having various functions including a printer function, a copy function, a scanner function, and a facsimile transmission function. However, the image forming apparatus 104 is not limited to this and may be an apparatus having a single function. The image forming apparatus 104 is configured to include a wireless access point so as to be capable of directly communicating with the data processing apparatus 101. A user can instruct the image forming apparatus 104 to execute jobs from the data processing apparatus 101 that communicates with the image forming apparatus 104 to thereby execute various functions of the image forming apparatus 104. Although the image forming apparatus 104 is configured to be connected to the network 103 by wire in this embodiment, the image forming apparatus 104 may be connected to the network 103 via the wireless LAN terminal 102 similarly to the data processing apparatus 101.

Further, the data processing apparatus 101 and the image forming apparatus 104 can perform short-range wireless communication conforming to, for example, NFC or Bluetooth Low Energy (BLE). The image forming apparatus 104 transmits to the data processing apparatus 101 via an NFC communication unit or a BLE communication unit described below, connection information (an Internet Protocol (IP) address or a Media Access Control (MAC) address, a Service Set IDentifier (SSID), and so on) for a wireless LAN connection with the image forming apparatus 104. The data processing apparatus 101 uses the obtained connection information to start wireless LAN communication with the image forming apparatus 104.

Figure 2:
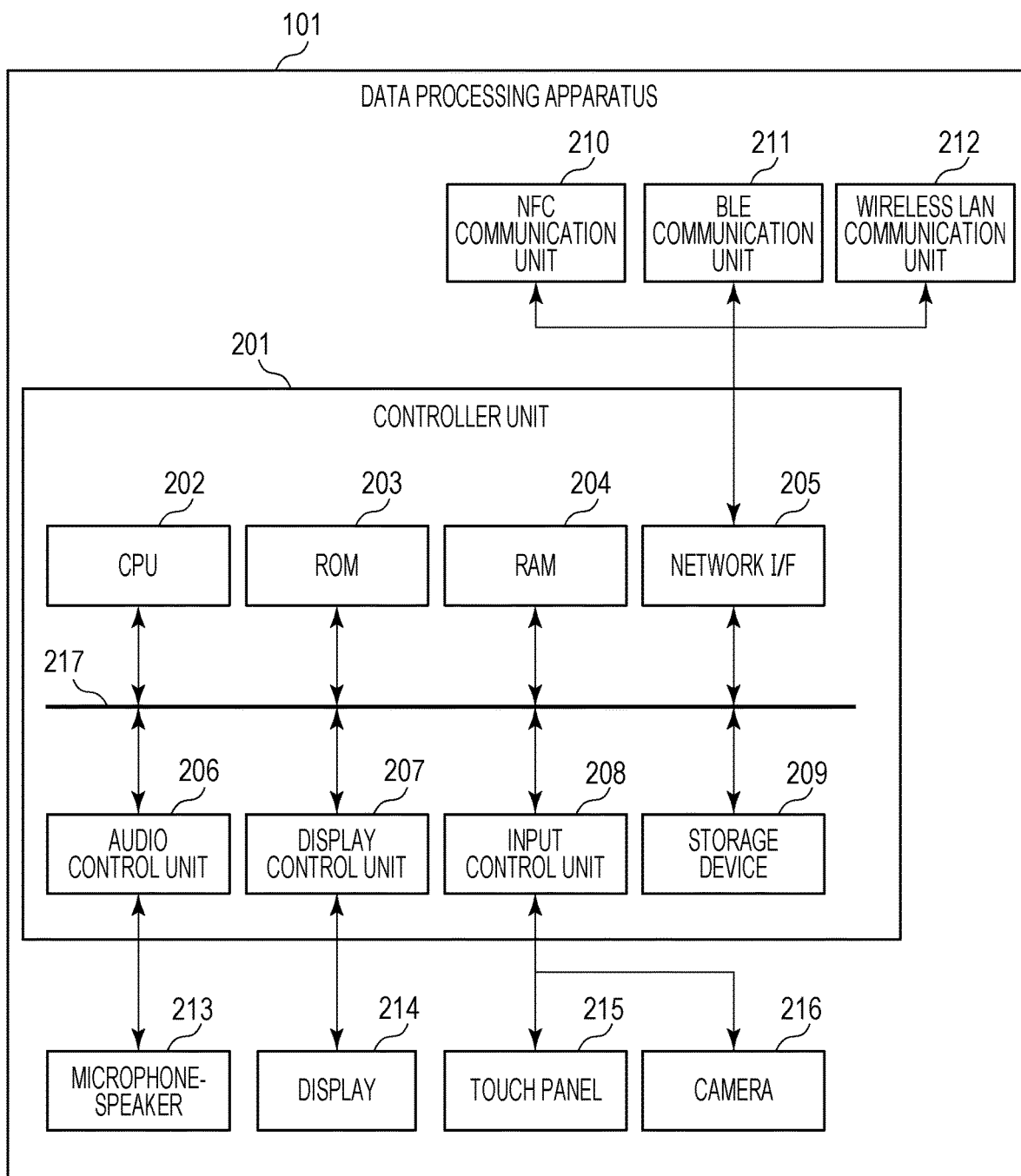
FIG. 2 is a block diagram illustrating a hardware configuration of a data processing apparatus.

FIG. 2 is a diagram illustrating a hardware configuration of the data processing apparatus 101 according to this embodiment. The data processing apparatus 101 includes a controller unit 201. The controller unit 201 controls various communication units including an NFC communication unit 210, a BLE communication unit 211, and a wireless LAN communication unit 212 and various user interface (UI) units including a microphone-speaker 213, a display 214, and a touch panel 215.

The controller unit 201 includes a central processing unit (CPU) 202, a read-only memory (ROM) 203, a random access memory (RAM) 204, a network interface (I/F) 205, an audio control unit 206, a display control unit 207, an input control unit 208, and a storage device 209, and these are connected to each other via a system bus 217.

The CPU 202 controls the entire system of the data processing apparatus 101. The ROM 203 stores the operating system of the data processing apparatus 101 and programs for controlling calls, data communication, and so on, and the CPU 202 executes the programs. The RAM 204 is used as a main memory of the CPU 202 and as a temporary storage area, such as a work area.

The storage device 209 is a nonvolatile storage device to which settings in various operation modes, an operation log, and so on that need to be retained even after the restart of the data processing apparatus 101 are recorded.

The network I/F 205 is connected to the NFC communication unit 210, the BLE communication unit 211, and the wireless LAN communication unit 212 to exchange data with the image forming apparatus 104 through various types of wireless communication.

The audio control unit 206 controls input and output of audio data via the microphone-speaker 213. The display control unit 207 controls output of a screen to be displayed on the display 214. The input control unit 208 controls input of information specified by the user using a button or the touch panel 215. Various applications executed by the data processing apparatus 101 use the audio control unit 206, the display control unit 207, the input control unit 208, and so on.

Figure 3:
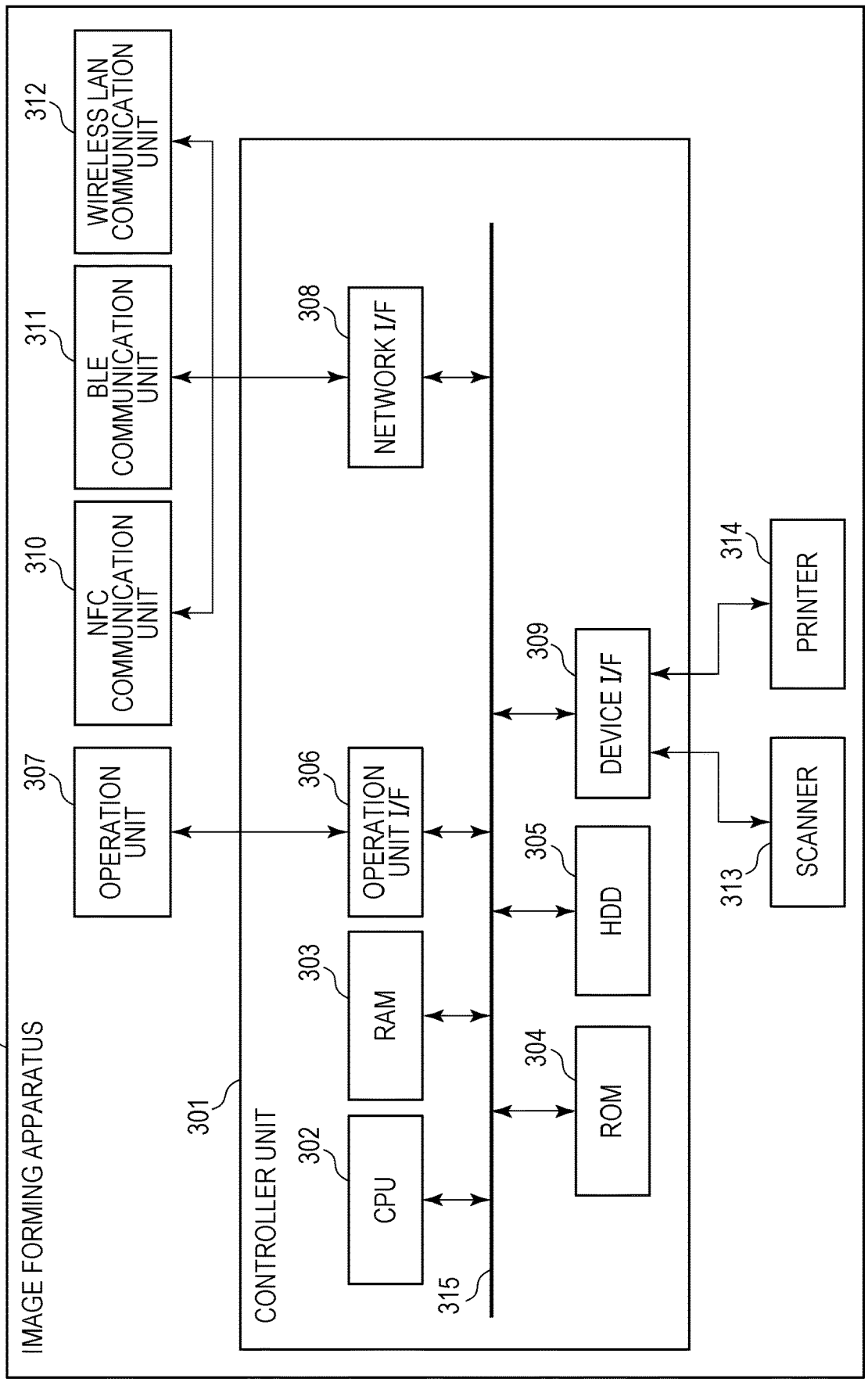
FIG. 3 is a block diagram illustrating a hardware configuration of an image forming apparatus.

FIG. 3 is a diagram illustrating a hardware configuration of the image forming apparatus 104 according to this embodiment. The image forming apparatus 104 includes a controller unit 301 and controls various communication units including an NFC communication unit 310, a BLE communication unit 311, and a wireless LAN communication unit 312, an operation unit 307, a scanner 313 that executes the scan function, and a printer 314 that executes the print function. In a case where a user uses the copy function of the image forming apparatus 104, the controller unit 301 controls the scanner 313 to obtain image data of an original document, and controls the printer 314 to print an image on a sheet and output the sheet. In a case where a user uses a "scan and transmit" function, the controller unit 301 controls the scanner 313 to obtain image data of an original document and convert the image data to code data. The controller unit 301 transmits the code data to, for example, the data processing apparatus 101 via a network I/F 308. In a case where a user uses the print function, the controller unit 301 receives image data (code data) from the data processing apparatus 101 via the network I/F 308. The controller unit 301 transmits the received image data to the printer 314. The printer 314 prints an image on a sheet and outputs the sheet on the basis of the received image data. The image forming apparatus 104 further has a facsimile reception function of receiving data from, for example, an Integrated Services Digital Network (ISDN) and printing the data and a facsimile transmission function of transmitting scanned data to, for example, an ISDN. To execute each of the functions as described above, the image forming apparatus 104 executes a job, which is a processing target task for which the user performs a setting operation and so on, in accordance with job information. For example, in a case of a "scan and transmit" job, a scan is performed in accordance with scan settings included in job information, and image data generated as a result of the scan is transmitted to a destination included in the job information.

The controller unit 301 includes a CPU 302, a RAM 303, a ROM 304, a hard disk drive (HDD) 305, an operation unit I/F 306, the network I/F 308, and a device I/F 309, and these are connected to each other via a system bus 315.

The CPU 302 controls the entire system of the image forming apparatus 104. The RAM 303 is a system work memory for the CPU 302 to operate, and temporarily stores image data and so on.

The RAM 303 stores scan image data read by the scanner 313 and print image data received from the data processing apparatus 101 over the network 103.

The ROM 304 stores a boot program for the system, applications, and so on. The HDD 305 stores an operating system and system software, application software, image data, setting data, and so on.

The operation unit 307 displays information for a user and accepts an operation from a user.

The operation unit 307 includes an operation panel, such as a touch panel display, and hardware keys.

The operation unit I/F 306 outputs to the operation unit 307 information to be displayed on the operation unit 307.

The operation unit I/F 306 accepts input by a user from the operation unit 307 information. The network I/F 308 is connected to the NFC communication unit 310, the BLE communication unit 311, and the wireless LAN communication unit 312 to exchange information with the data processing apparatus 101 or a cloud server through various types of communication. The wireless LAN communication unit 312 performs wireless LAN communication with the data processing apparatus 101 over the network 103. The NFC communication unit 310 and the BLE communication unit 311 perform short-range wireless communication with the data processing apparatus 101. The image forming apparatus 104 receives setting information and image data of a job, a job execution command, and so on from the data processing apparatus 101 via the network I/F 308 and executes the job. The device I/F 309 connects the scanner 313 and the printer 314 that respectively read and print image data with the controller unit 301 to input and output image data.

Figure 4:
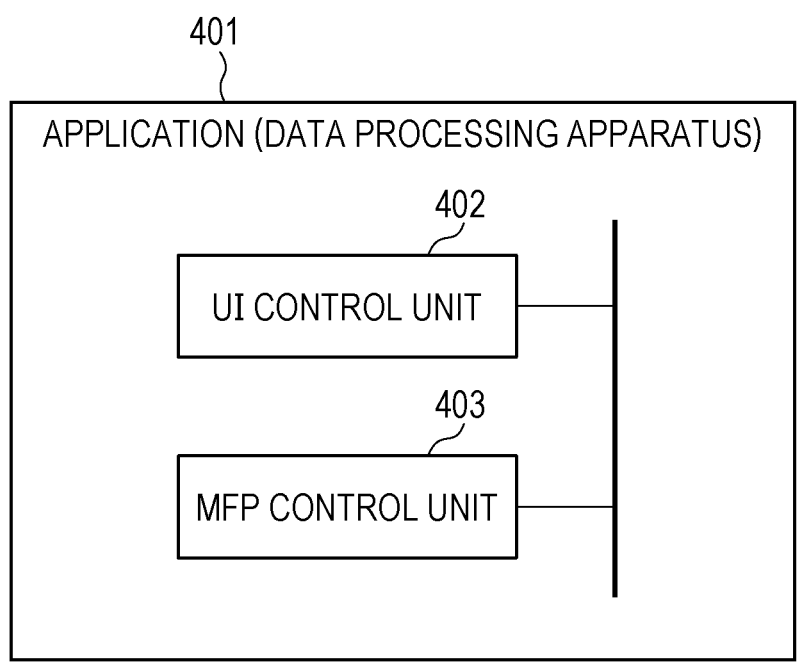
FIG. 4 is a block diagram illustrating a software configuration of the data processing apparatus.

FIG. 4 is a block diagram illustrating a software configuration of the data processing apparatus 101 according to this embodiment. FIG. 4 is a functional block diagram of software implemented by the CPU 202 reading a control program stored in the ROM 203 or the storage device 209.

An application 401 is installed in the data processing apparatus 101 and is an application for operating the image forming apparatus 104. The application 401 communicates with the image forming apparatus 104 and transmits various requests and receives various responses to and from the image forming apparatus 104 to thereby cooperate with the image forming apparatus 104. For example, print job information or scan job information can be generated by performing a setting operation on the application 401, and the job information can be transmitted to the image forming apparatus 104. Although various applications are installed in the data processing apparatus 101 in addition to the application 401, descriptions of such applications will be omitted. The configuration of the application 401 will be described below.

A UI control unit 402 accepts setting information of a job and connection information of the image forming apparatus 104 input by the user on the touch panel 215 and transmits the information to an MFP control unit 403. The UI control unit 402 receives a response from the MFP control unit 403 and outputs the response to the display 214 via the display control unit 207. The UI control unit 402 further controls the automatic clearing function as part of user interface control. Automatic clearing is a process of clearing the values of all settings set on a display screen or displaying an initial screen set in advance in a case where the data processing apparatus 101 accepts no operation from the user for a predetermined time. The initial screen can be set in advance by the user, and in a case where the user remains logged in to the data processing apparatus 101 upon the occurrence of automatic clearing, a log-out process is automatically performed. A count-down timer for measuring the remaining time until the occurrence of automatic clearing is hereinafter referred to as "automatic clearing timer". The automatic clearing timer measures the time during which no operation is accepted from the user.

The MFP control unit 403 establishes communication with the image forming apparatus 104, and transmits a request and receives a response to and from the image forming apparatus 104. The MFP control unit 403 generates job execution instruction information from job settings accepted by the UI control unit 402 and transmits a job execution request to the image forming apparatus 104 over the network 103. The MFP control unit 403 obtains a job execution status from the image forming apparatus 104 over the network 103 and transmits the job execution status to the UI control unit 402.

Figure 5:
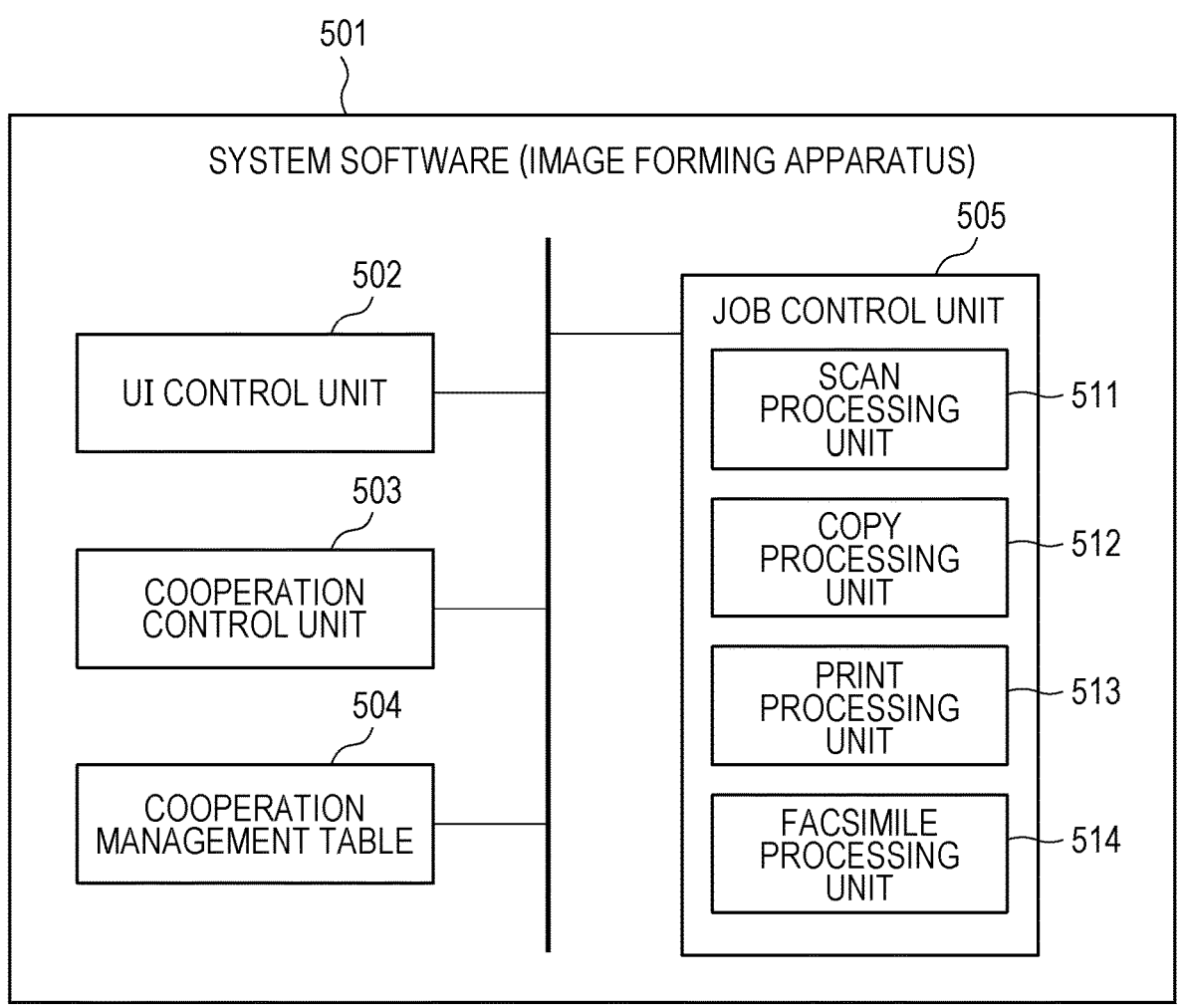
FIG. 5 is a block diagram illustrating a software configuration of the image forming apparatus.

FIG. 5 is a block diagram illustrating a software configuration of the image forming apparatus 104 according to this embodiment. System software 501 is software executed by the CPU 302 of the image forming apparatus 104 and is stored in the HDD 305.

A UI control unit 502 accepts information input by a user on the operation unit 307 and, for example, controls a screen. The UI control unit 502 controls the automatic clearing function as part of user interface control. In a case where a user remains logged in to the image forming apparatus 104 upon the occurrence of automatic clearing, the UI control unit 502 automatically performs a log-out process.

A cooperation control unit 503 controls cooperation between the data processing apparatus 101 and the image forming apparatus 104. Specifically, the cooperation control unit 503 controls the image forming apparatus 104 on the basis of a request received from the data processing apparatus 101 and transmits to the data processing apparatus 101 a response to the request. The cooperation control unit 503 manages the state (hereinafter referred to as "cooperation state") of the image forming apparatus 104 when the data processing apparatus 101 and the image forming apparatus 104 cooperate with each other.

A cooperation management table 504 is a table for managing information necessary for the cooperation control unit 503 to control cooperation between the data processing apparatus 101 and the image forming apparatus 104.

A job control unit 505 controls processing units including a scan processing unit 511, a copy processing unit 512, a print processing unit 513, and a facsimile processing unit 514 in accordance with job settings and executes various jobs.

FIGS. 12A to 12E illustrate examples of screens displayed by the image forming apparatus 104 in this embodiment.

Figure 12A:
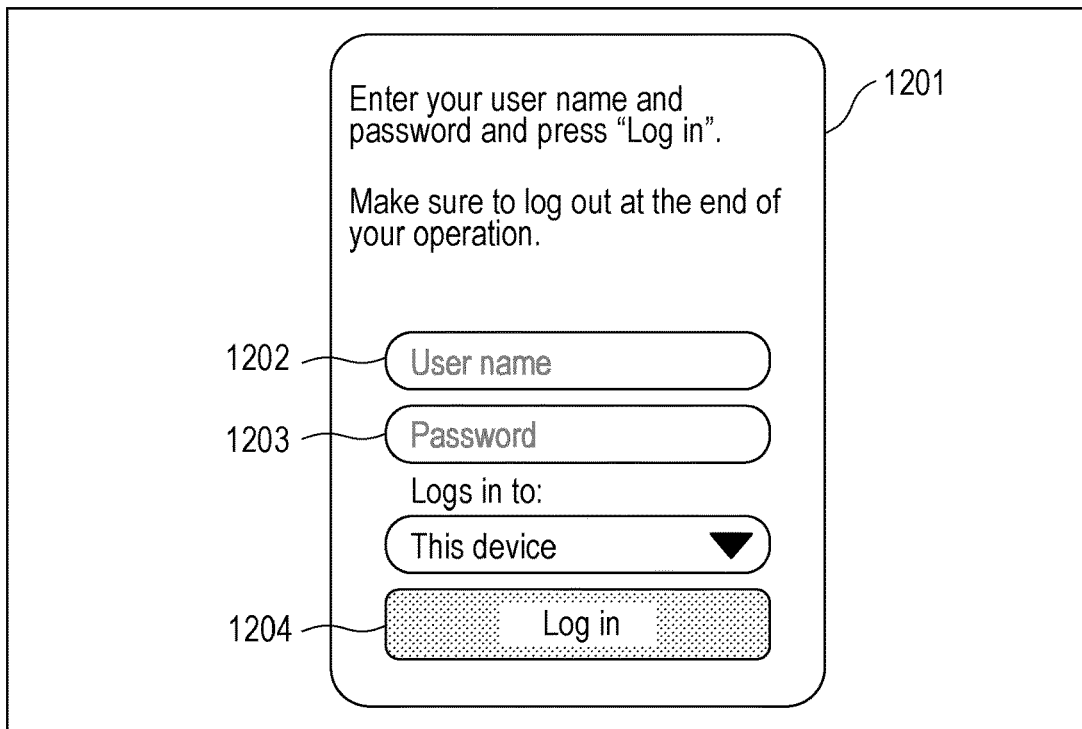
FIGS. 12A to 12E illustrate examples of screens of the image forming apparatus in the first embodiment.

FIG. 12A is a diagram illustrating an authentication screen of the image forming apparatus 104 according to this embodiment. A log-in screen 1201 is a screen for a user authentication and includes a user name input field 1202 into which the user name of a user who locally logs in and a password input field 1203 into which a password is input. Local log-in is log-in for a user to exclusively operate the operation panel of the image forming apparatus 104, and other users are not allowed to locally log in or operate the operation panel while the user remains locally logged in. When a log in button 1204 is pressed, the user name and the password respectively input into the user name input field 1202 and the password input field 1203 are used to start a local log-in process. Hereinafter, "log-in" refers to local log-in unless otherwise noted.

Figure 12B:
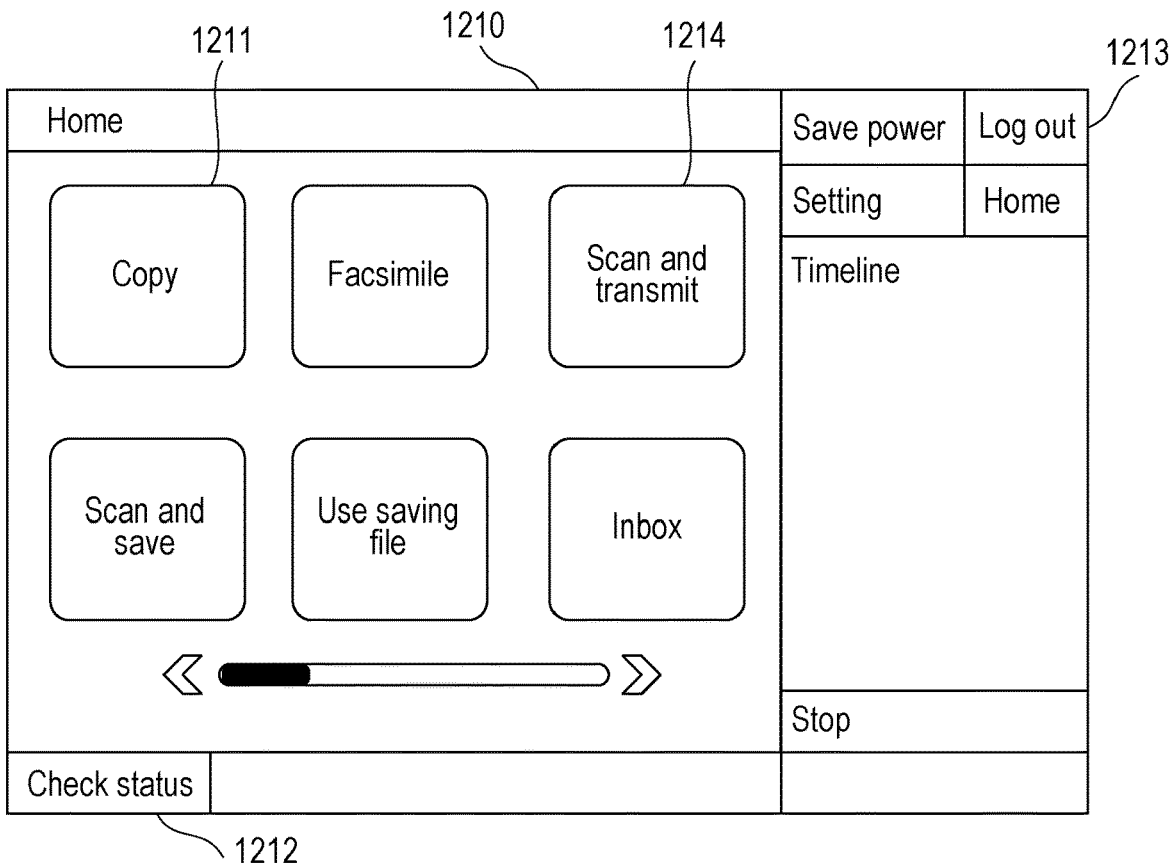

FIG. 12B is a diagram illustrating a home screen of the image forming apparatus 104, and the home screen is displayed when, for example, authentication on the log-in screen 1201 is successful and the user logs in to the image forming apparatus 104.

A home screen 1210 is a screen for displaying functions of the image forming apparatus 104 in an array and is a screen for a user to select a function to be used. A copy button 1211 is a button for executing the copy function, and when pressed, a transition to a copy setting screen (not illustrated) takes place. When a check status button 1212 is pressed, a transition to a status check screen (not illustrated) takes place on which the user can refer to the execution status of a job and a history. A log out button 1213 displays the user name of a locally logged-in user, and when pressed, the logged-in user is made to log out and a transition to the log-in screen 1201 takes place. A "scan and transmit" button 1214 is a button for executing a function of transmitting a scanned image to a set destination. When the "scan and transmit" button 1214 is pressed, a transition to a "scan and transmit" setting screen 1220 takes place.

Figure 12C:
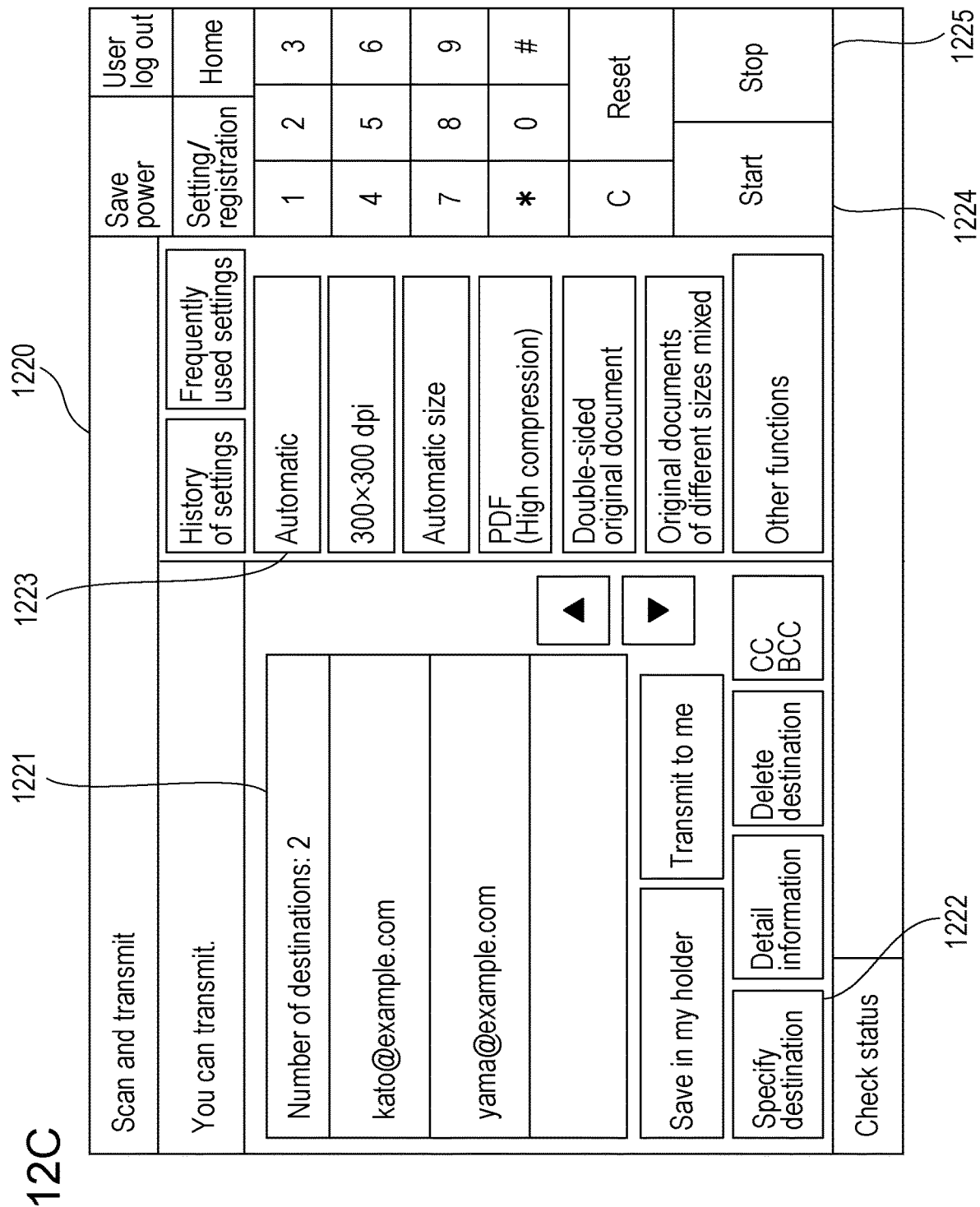

FIG. 12C is a diagram illustrating a screen of the "scan and transmit" function of the image forming apparatus 104. The "scan and transmit" setting screen 1220 is a screen for setting a scan and a destination of an image. In a destination field 1221, already set destinations of images are displayed. A specify destination button 1222 is a button for setting a destination of an image, and when pressed, a list of destinations is displayed. A scan setting area 1223 is an area for performing a setting operation for a scan, and settings can be specified by pressing respective buttons. A start button 1224 is a button for performing a process on the basis of the specifics set on the "scan and transmit" setting screen 1220, and when pressed, a scan is performed and an image generated as a result of the scan is transmitted to a set destination. When the start button 1224 is pressed, the image forming apparatus 104 displays a process-in-progress screen (not illustrated) to show the status of the process that is being performed. When the process ends, the "scan and transmit" setting screen 1220 is displayed, or a transition to the home screen 1210 takes place. A stop button 1225 is a button for stopping the process that is in progress.

Figure 12D:
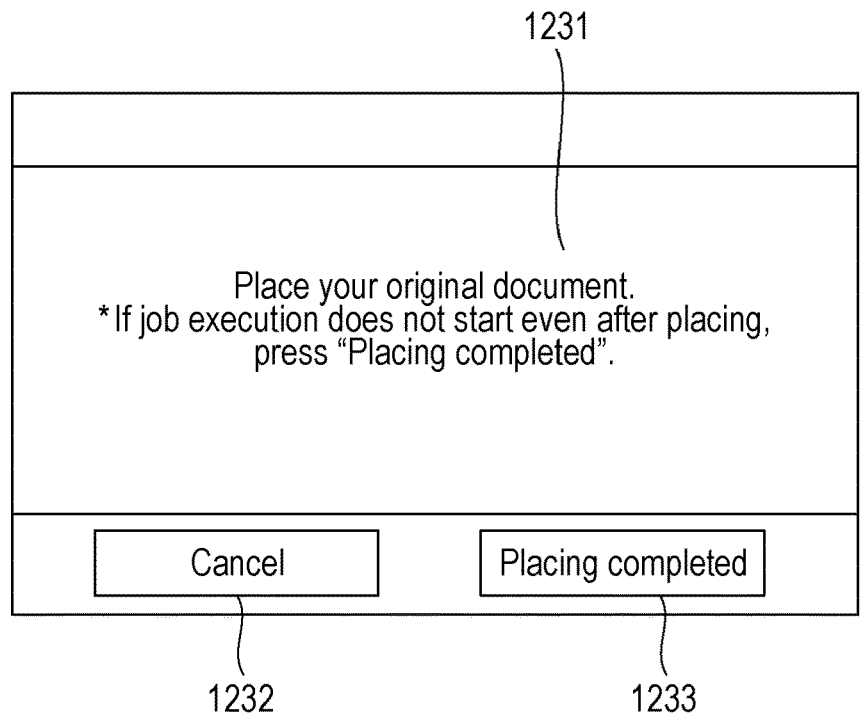

FIG. 12D illustrates an original-document placing screen for prompting a user to place an original document. An original-document placing screen 1231 is displayed in a case where an original document is not placed on the scanner of the image forming apparatus 104 upon reception of a "scan and transmit" job from the data processing apparatus 101. When a cancel button 1232 is pressed, the job is canceled, and when an original document is placed or a placing completed button 1233 is pressed, the process starts.

Figure 12E:
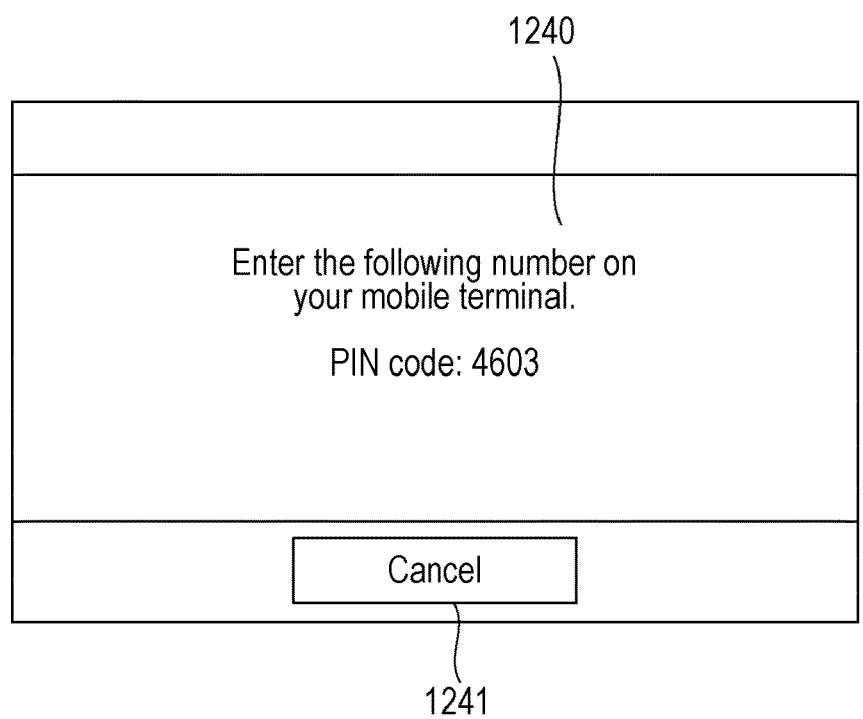

FIG. 12E is a Personal Identification Number (PIN) code screen for displaying a PIN code to be input on the data processing apparatus 101. This screen is displayed upon the image forming apparatus 104 receiving a "scan and transmit" job from the data processing apparatus 101. To verify that the user of the data processing apparatus 101 is present in front of the image forming apparatus 104, the user is made to input on the data processing apparatus 101 a PIN code displayed on a PIN code screen 1240. The PIN code screen 1240 includes an area for displaying a PIN code generated in step S1121 and a message for prompting the user to input the PIN code. A cancel button 1241 is a button for canceling the cooperation state. When a PIN code input on the data processing apparatus 101 is correct, the image forming apparatus 104 executes the "scan and transmit" job.

When the operation unit 307 accepts no operation from a user for a predetermined time while any of the screens illustrated in FIGS. 12B to 12E is displayed and an automatic clearing process is performed, the set values are cleared and the initial screen set in advance (for example, the home screen 1210) is displayed. In a case where the user remains logged in to the image forming apparatus 104 upon the automatic clearing process, the user is made to log out and the log-in screen 1201 is displayed.

FIGS. 8A to 8E illustrate examples of screens that are displayed in a case where the application 401 of the data processing apparatus 101 performs a process for instructing the image forming apparatus 104 to execute a job.

Figure 8C:
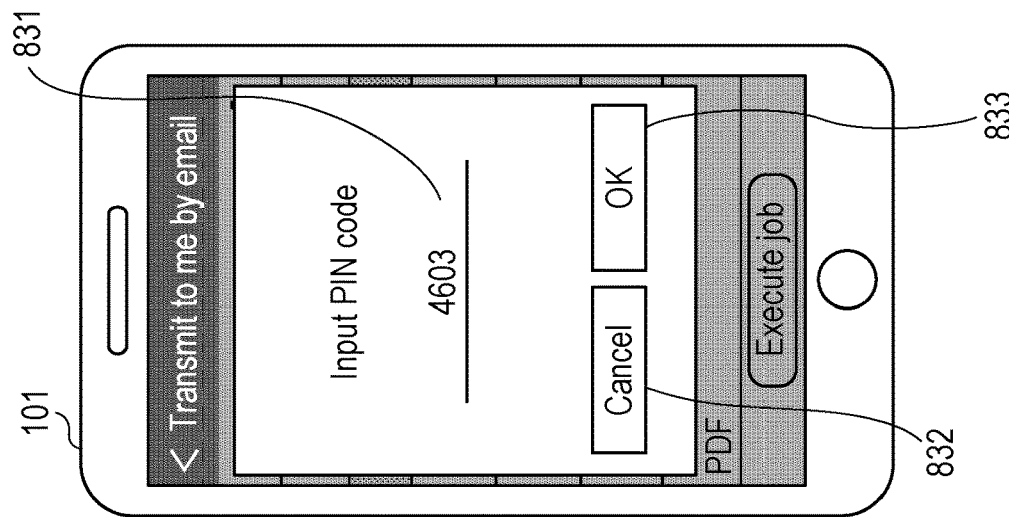
FIGS. 8A to 8E illustrate examples of screens of the data processing apparatus in the first embodiment.
Figure 8B:
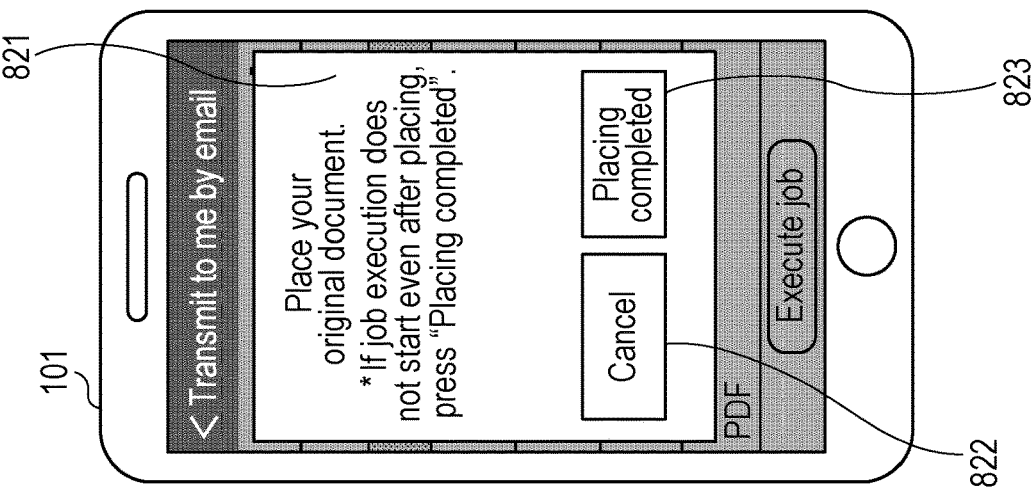
Figure 8A:
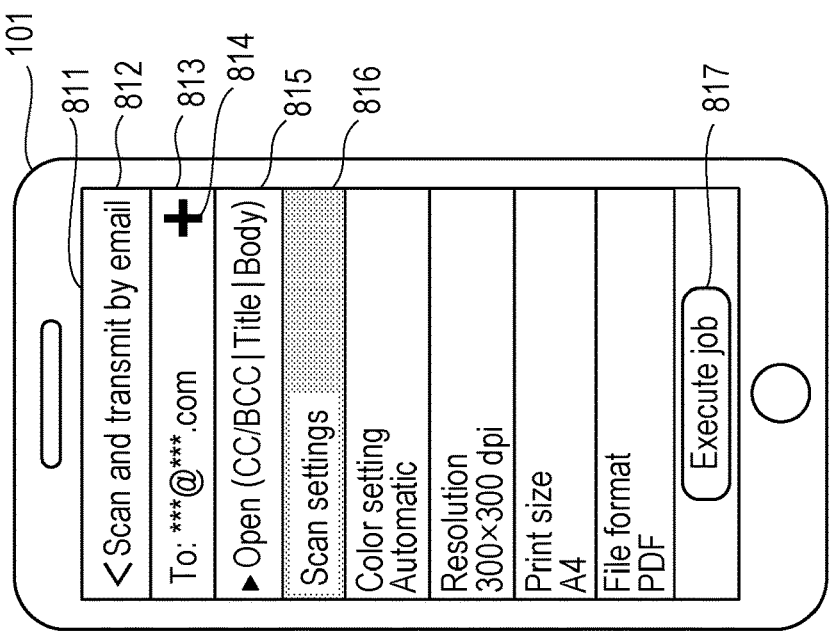

FIG. 8A illustrates an example of a job setting screen for "scan and transmit". A job setting screen 811 is displayed when a "scan and transmit" button 852 is selected from a menu screen 851 of the application 401. The job setting screen 811 allows a setting operation for transmitting by email, an image generated by scanning an original document by the image forming apparatus 104. In a title 812, a title is displayed and a button for canceling settings and returning to the previous screen is provided. In an email address setting area 813, already set destinations are displayed, and when this area is pressed, a software keyboard for inputting an email address of a destination is displayed. When an address book start button 814 is pressed, an address book in the data processing apparatus 101 is started, and the email address of a destination can be selected. A plurality of email addresses can be set. When an open button 815 is pressed, switching to a display screen that allows setting of CC, BCC, the subject, the body, and the file name takes place, and these items can be input. In a scan setting area 816, buttons for specifying scan settings including a color setting and a resolution when the image forming apparatus 104 performs a scan are provided.

When each of the buttons is pressed, a corresponding one of the settings can be changed. An execute job button 817 is a button for creating job information with the set values of the settings and transmitting the job information to the image forming apparatus 104.

FIG. 8B illustrates an original-document placing screen that is a screen displayed in a case where an original document is not placed on the image forming apparatus 104 upon transmission of "scan and transmit" job information to the image forming apparatus 104. A message area 821 is an area for displaying a message for prompting the user to place an original document. A cancel button 822 is a button for canceling the cooperation state. A placing completed button 823 is a button for notifying the image forming apparatus 104 that an original document has been placed, in a case where the user has placed the original document on the scanner 313 of the image forming apparatus 104 but the image forming apparatus 104 (scanner 313) does not detect the original document.

FIG. 8C illustrates a PIN code input screen. This is a screen for inputting a PIN code included in the PIN code screen 1240 displayed on the image forming apparatus 104 after transmission of "scan and transmit" job information to the image forming apparatus 104. A PIN code input field 831 is an input field for inputting a PIN code. A cancel button 832 is a button for canceling the cooperation state. An OK button 833 is a button for transmitting a PIN code input into the PIN code input field 831 to the image forming apparatus 104. A configuration may be employed in which a QR code (registered trademark) is displayed on the image forming apparatus 104 instead of a PIN code and the QR code is read by a camera 216 included in the data processing apparatus 101 to thereby transmit authentication information.

Figure 8E:
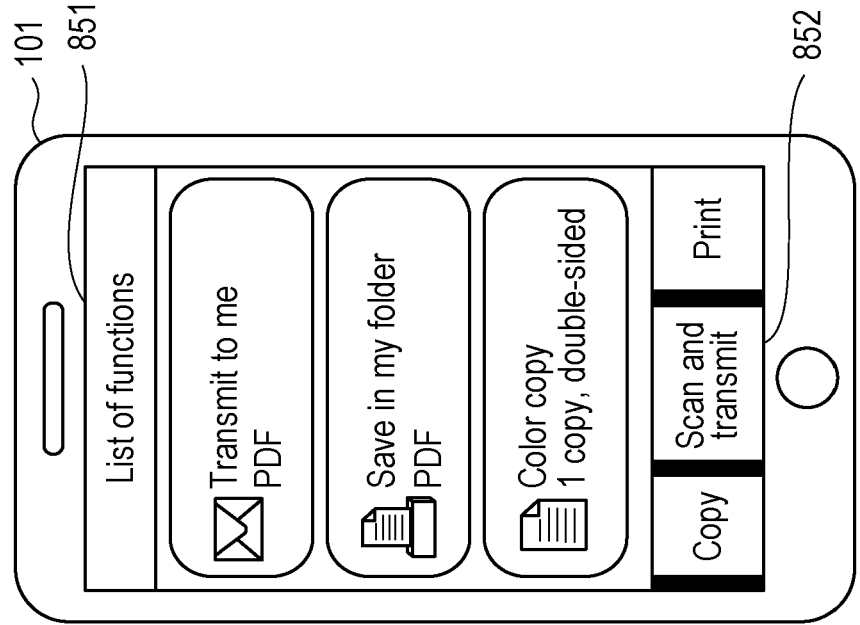
Figure 8D:
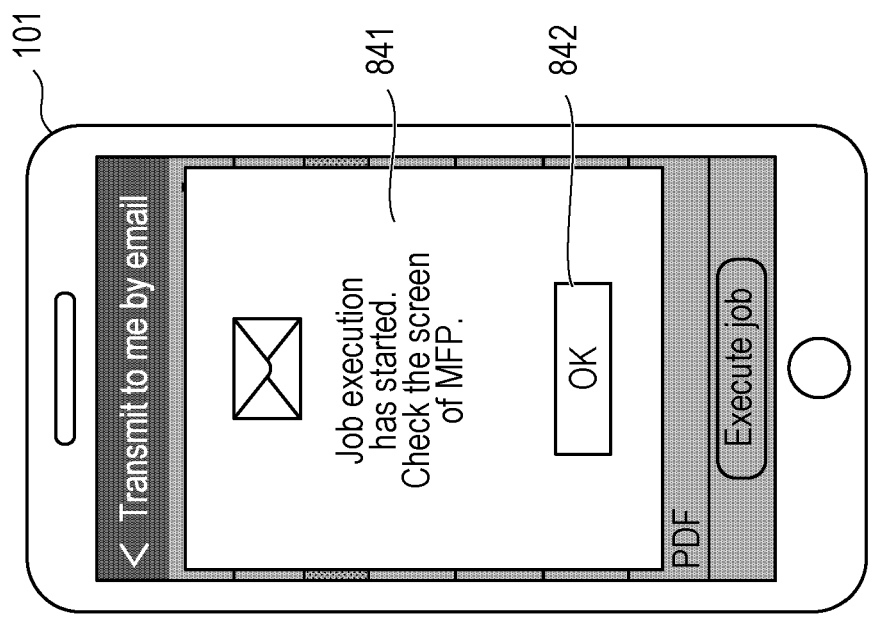

FIG. 8D illustrates an end notification screen. This is a screen displayed when a PIN code input on the PIN code input screen is authenticated and job execution is started by the image forming apparatus 104. A message area 841 is an area for displaying a message corresponding to a cooperation state received in step S708. In the message area 841 illustrated in FIG. 8D, an example in a case where the cooperation state is "job execution" is displayed. An OK button 842 is a button for closing the end notification screen. When the end notification screen is closed, a transition to the menu screen of the application 401 takes place.

FIG. 8E illustrates the menu screen of the application 401. The menu screen 851 is the initial screen that is displayed when the application 401 is started, and the user selects a desired function from the menu screen. When the "scan and transmit" button 852 is pressed, the job setting screen 811 is displayed.

In a case where no operation is accepted from the user for a predetermined time while the data processing apparatus 101 displays any of the screens illustrated in FIGS. 8A to 8D, an automatic clearing process is performed, and the initial screen (for example, the menu screen illustrated in FIG. 8E) is displayed.

As described above, when a "scan and transmit" job is set on the application 401 and job information is transmitted to the image forming apparatus 104, and an original document is placed and a PIN code is input, the job is executed by the image forming apparatus 104.

In a case where the data processing apparatus 101 is operated to make the image forming apparatus 104 perform a process, when the operation unit 307 of the image forming apparatus 104 accepts no operation from the user for a predetermined time and an automatic clearing process is performed as in the related art, a problem may arise. For example, when the image forming apparatus 104 determines that the operation unit 307 thereof accepts no operation even though the user performs an operation on the original-document placing screen illustrated in FIG. 8B or the PIN code input screen illustrated in FIG. 8C on the data processing apparatus 101, keeps the automatic clearing timer counting, and performs an automatic clearing process, the original-document placing screen and the PIN code screen illustrated in FIG. 12E are prevented from being displayed on the image forming apparatus 104 and, for example, the initial screen is displayed. Then, the user is, for example, unable to know a PIN code to be input and unable to make the process proceed. In this embodiment, when an operation is accepted by the data processing apparatus 101, the image forming apparatus 104 is configured to reset the automatic clearing timer.

FIG. 17 is a sequence chart illustrating interaction between the image forming apparatus 104 and the data processing apparatus 101 in this embodiment.

When job settings from the user are accepted on the application 401 of the data processing apparatus 101 and an instruction for transmitting job information to the image forming apparatus 104 is accepted, the data processing apparatus 101 resets the automatic clearing timer thereof in S1701, and a job execution request is transmitted from the data processing apparatus 101 to the image forming apparatus 104 in S1702. That is, job information for making the image forming apparatus 104 execute a job is transmitted to the image forming apparatus 104. The remaining time of the automatic clearing timer decreases as time passes, and when the remaining time becomes equal to zero, automatic clearing occurs. When the automatic clearing timer is reset, the remaining time until the occurrence of automatic clearing is reset to the automatic clearing time. For example, in a case where the automatic clearing time is set to 120 seconds, the remaining time is reset to 120 seconds when the automatic clearing timer is reset.

When receiving the job execution request, the image forming apparatus 104 resets the automatic clearing timer thereof in S1703. In a case where an original document is placed on the image forming apparatus 104, the cooperation state is changed to "PIN code request" in S1704, and a response is transmitted to the data processing apparatus 101 in S1705. The cooperation state will be described below.

The data processing apparatus 101 transmits a cooperation state obtaining request to the image forming apparatus 104 in S1706, and the image forming apparatus 104 returns a response in S1707. In S1708, the data processing apparatus 101 determines whether the cooperation state has changed on the basis of the received response information, and in a case where the cooperation state has changed, the data processing apparatus 101 resets the automatic clearing timer in S1709 and performs display corresponding to the changed cooperation state. It is assumed that the request and response process in S1706 and S1707 is performed occasionally after transmission of the job information.

It is assumed that the process in S1710 and the subsequent steps is performed asynchronously to the steps described above.

When pressing of the placing completed button 823 by the user is accepted on the application 401 of the data processing apparatus 101, the data processing apparatus 101 resets the automatic clearing timer thereof in S1710 and transmits an original-document placing request to the image forming apparatus 104 in S1711.

When receiving the original-document placing request, the image forming apparatus 104 resets the automatic clearing timer thereof in S1712. The image forming apparatus 104 changes the cooperation state to "PIN code request" in S1713 and transmits an original-document placing response to the data processing apparatus 101 in S1714.

When accepting a PIN code input by the user on the application 401 of the data processing apparatus 101, the data processing apparatus 101 resets the automatic clearing timer thereof in S1715 and transmits an unlock-with-PIN request to the image forming apparatus 104 in S1716.

When receiving the unlock-with-PIN request, the image forming apparatus 104 resets the automatic clearing timer thereof in S1717. The image forming apparatus 104 changes the cooperation state to "job execution" in S1718, transmits an unlock-with-PIN response to the data processing apparatus 101 in S1719, and executes the job in S1720 on the basis of the received job information.

FIGS. 6A and 6B illustrate an example of the cooperation management table 504 in this embodiment. The cooperation management table 504 includes two tables, namely a request management table 600 and an event management table 650.

FIG. 6A illustrates an example of the request management table 600 for managing requests received by the image forming apparatus 104 from the data processing apparatus 101. One row defines information about one type of request.

A "request type" column 601 includes the type of a request received by the image forming apparatus 104.

A "job execution request" is a request for instructing the image forming apparatus 104 to execute a job. A "cooperation state obtaining request" is a request for obtaining state information from the image forming apparatus 104. An "original-document placing request" is a request for a notification that an original document has been placed. An "unlock-with-PIN request" is a request for performing authentication with an input PIN code. A "cancel request" is a request for canceling execution of a job.

A "cooperation state for acceptance" column 602 defines a cooperation state in which the request included in the "request type" column 601, when received, can be accepted. The table shows, for example, that the "job execution request" can be accepted only in a case where the cooperation state is "(not in cooperation)". The cooperation state "(not in cooperation)" refers to a state in which, for example, the data processing apparatus 101 and the image forming apparatus 104 communicate with each other but job information is not transmitted from the data processing apparatus 101 to the image forming apparatus 104, and a cooperation state "(in cooperation)" refers to a state in which job information has been transmitted from the data processing apparatus 101 to the image forming apparatus 104 and the apparatuses can cooperate with each other. As described above, the cooperation state indicates a stage or a status in a process performed by exchanging information between the data processing apparatus 101 and the image forming apparatus 104. The "cooperation state obtaining request" can be accepted only in a case where a job has been transmitted from the data processing apparatus 101 to the image forming apparatus 104 and the cooperation state is "(in cooperation)".

A "user-operation-causing request" column 603 defines whether the request in the "request type" column 601 is a request caused by a user operation. In a case of a row in which the "user-operation-causing request" column 603 includes "YES", the request is a request caused by a user operation. In a case of a row in which the "user-operation-causing request" column 603 includes "NO", the request is a request transmitted regardless of a user operation. For example, the "job execution request" is a request that is transmitted when the user presses a button for transmitting a job on the data processing apparatus 101, and therefore, "YES" is set in the "user-operation-causing request" column 603. The "cooperation state obtaining request" is not a request that is transmitted when the user operates the data processing apparatus 101, and therefore, "NO" is set in the "user-operation-causing request" column 603.

FIG. 6B illustrates an example of the event management table 650 for managing event information about an event based on which the cooperation state changes. One row defines information about one cooperation state, event information about an event that is handled in the cooperation state, and a changed cooperation state after the occurrence of the event. A "cooperation state" column 651 includes one cooperation state. An "occurring event" column 652 defines an event to be handled when the image forming apparatus 104 is in the state included in the "cooperation state" column 651, and the cooperation state is not changed in a case of the occurrence of an event not defined in the "occurring event" column 652.

A "changed cooperation state" column 653 defines a cooperation state after the occurrence of the event defined in the "occurring event" column 652. A description of, for example, a row 662 will be given. In a case where either a "scanner: an original document placed" event or a "UI: the placing completed button pressed" event occurs while the cooperation state is "waiting for an original document to be placed", the cooperation state transitions to "PIN code request".

Figure 7:
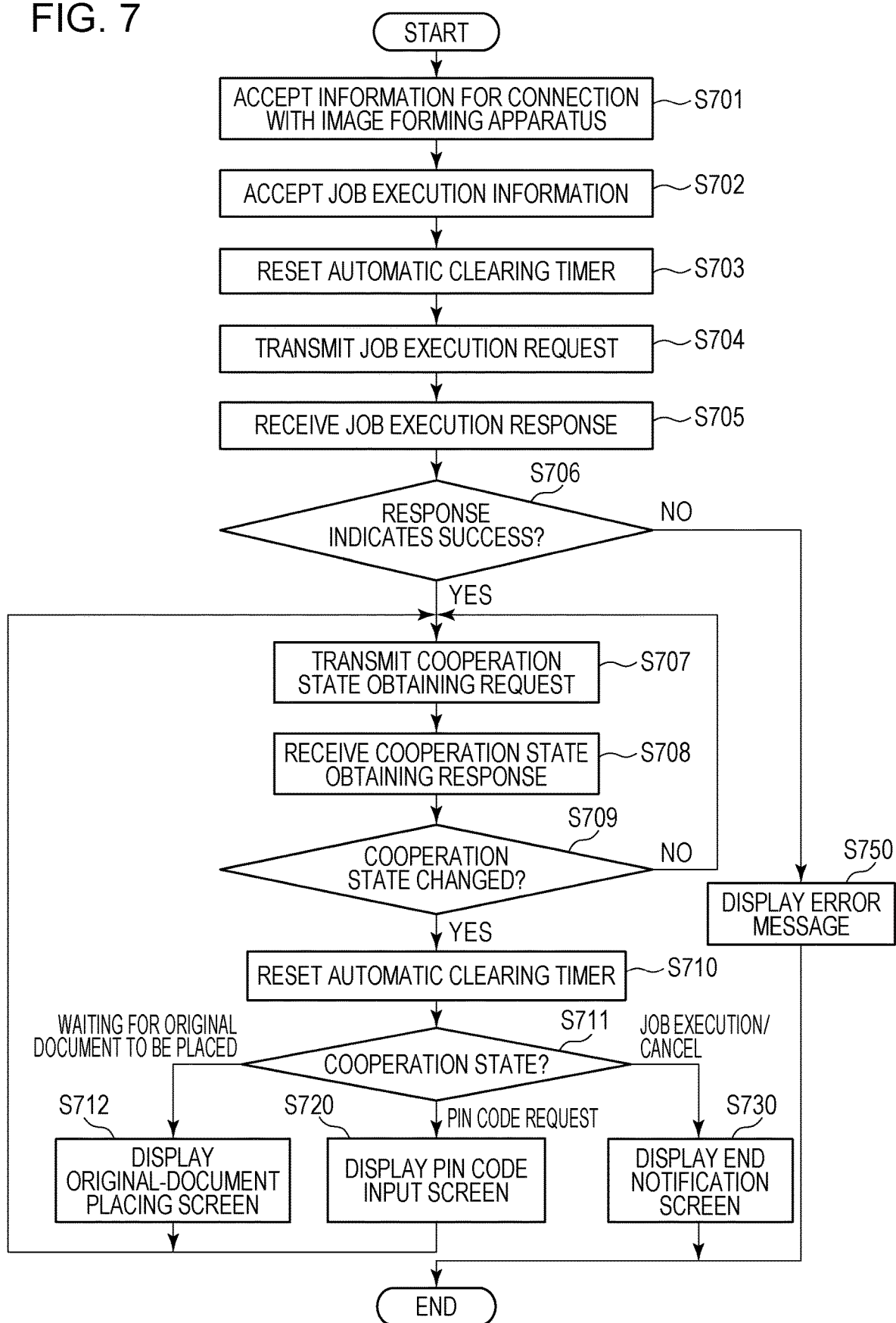
FIG. 7 is a flowchart illustrating a process performed by the data processing apparatus in the first embodiment.

With reference to FIG. 7 and FIGS. 8A to 8E, a process for a job execution instruction performed by the data processing apparatus 101 of this embodiment will be described. FIG. 7 is a flowchart for explaining the process for a job execution instruction, and the process is implemented by the CPU 202 of the data processing apparatus 101 loading a program for implementing a control module stored in the ROM 203 or the storage device 209 to the RAM 204 and executing the program.

In step S701, the UI control unit 402 accepts information (an IP address and so on) for a connection with the image forming apparatus 104 that executes a job, the information being input by the user performing an operation on a screen of the application 401. The information for a connection with the image forming apparatus 104 need not be input by the user but may be obtained through short-range wireless communication, such as NFC. The wireless LAN communication unit 212 may be used to search for an image forming apparatus that is connected to the network 103. It is assumed that the information accepted in step S701 is used to communicate with the image forming apparatus 104 in the subsequent steps.

In step S702, the UI control unit 402 accepts job settings and a transmission instruction for job information input by the user performing an operation on the job setting screen 811. Specifically, scan settings and a destination setting are accepted on the job setting screen 811, and pressing of the execute job button 817 is accepted.

In step S703, the UI control unit 402 resets the automatic clearing timer of the data processing apparatus 101.

In step S704, the MFP control unit 403 transmits a job execution request that includes the job information created on the basis of the operation accepted in step S702 to the image forming apparatus 104.

In step S705, the MFP control unit 403 receives a job execution response from the image forming apparatus 104 as a response to the request transmitted in step S704. In step S706, the MFP control unit 403 determines the content of the job execution response. If the content of the job execution response indicates a success, the MFP control unit 403 makes the process proceed to step S707; otherwise the MFP control unit 403 makes the process proceed to step S750.

In step S707, the MFP control unit 403 transmits a cooperation state obtaining request for obtaining the cooperation state to the image forming apparatus 104. In step S708, the MFP control unit 403 receives a cooperation state obtaining response from the image forming apparatus 104 as a response to the request transmitted in step S707. The cooperation state obtaining response includes the cooperation state of the image forming apparatus 104 and other information.

In step S709, the MFP control unit 403 determines whether the cooperation state received in step S708 has changed from the immediately preceding cooperation state. If the cooperation state has changed, the UI control unit 402 makes the process proceed to step S710; otherwise the UI control unit 402 makes the process return to step S707.

In step S710, the UI control unit 402 resets the automatic clearing timer of the data processing apparatus 101 in response to the changed cooperation state. Although a change in the cooperation state is used as an example of the basis for determining whether to reset the automatic clearing timer upon reception of the cooperation state obtaining response in this flowchart, another basis for determination may be used. For example, determination may be performed on the basis of the type of the cooperation state included in the cooperation state obtaining response or determination may be performed by using other information (for example, information about whether a user operation is performed on the image forming apparatus 104) included in the cooperation state obtaining response.

In step S711, the MFP control unit 403 makes the process proceed to step S712 if the cooperation state received in step S708 is "waiting for an original document to be placed", makes the process proceed to step S720 if the cooperation state received in step S708 is "PIN code request", or makes the process proceed to step S730 if the cooperation state received in step S708 is "job execution" or "cancel".

In step S712, the UI control unit 402 displays the original-document placing screen (FIG. 8B) on the display 214, and subsequently, makes the process return to step S707. The original-document placing screen is a screen for displaying a message for prompting the user to place an original document on the scanner 313 of the image forming apparatus 104. A process that is performed in a case where a user operation is performed on the original-document placing screen will be described below with reference to the flowchart in FIG. 9A.

In step S720, the UI control unit 402 displays the PIN code input screen (FIG. 8C) on the display 214, and subsequently, makes the process return to step S707. The PIN code input screen is a screen for inputting a PIN code displayed on the operation unit 307 of the image forming apparatus 104. A process that is performed in a case where a user operation is performed on the PIN code input screen will be described below with reference to the flowchart in FIG. 9B.

In step S730, the UI control unit 402 displays the end notification screen (FIG. 8D) on the display 214 and ends the process in the flowchart. The end notification screen is a screen for notifying the user of the end state when the cooperation state with the image forming apparatus 104 ends.

In step S750, the UI control unit 402 displays on the display 214 a message saying that the job execution instruction results in an error and ends the process in the flowchart.

With the above-described process in the flowchart, even if the operation unit of the data processing apparatus 101 accepts no operation from the user for a predetermined time during cooperation between the data processing apparatus 101 and the image forming apparatus 104, an automatic clearing process can be prevented from being performed in the data processing apparatus 101.

Figure 9B:
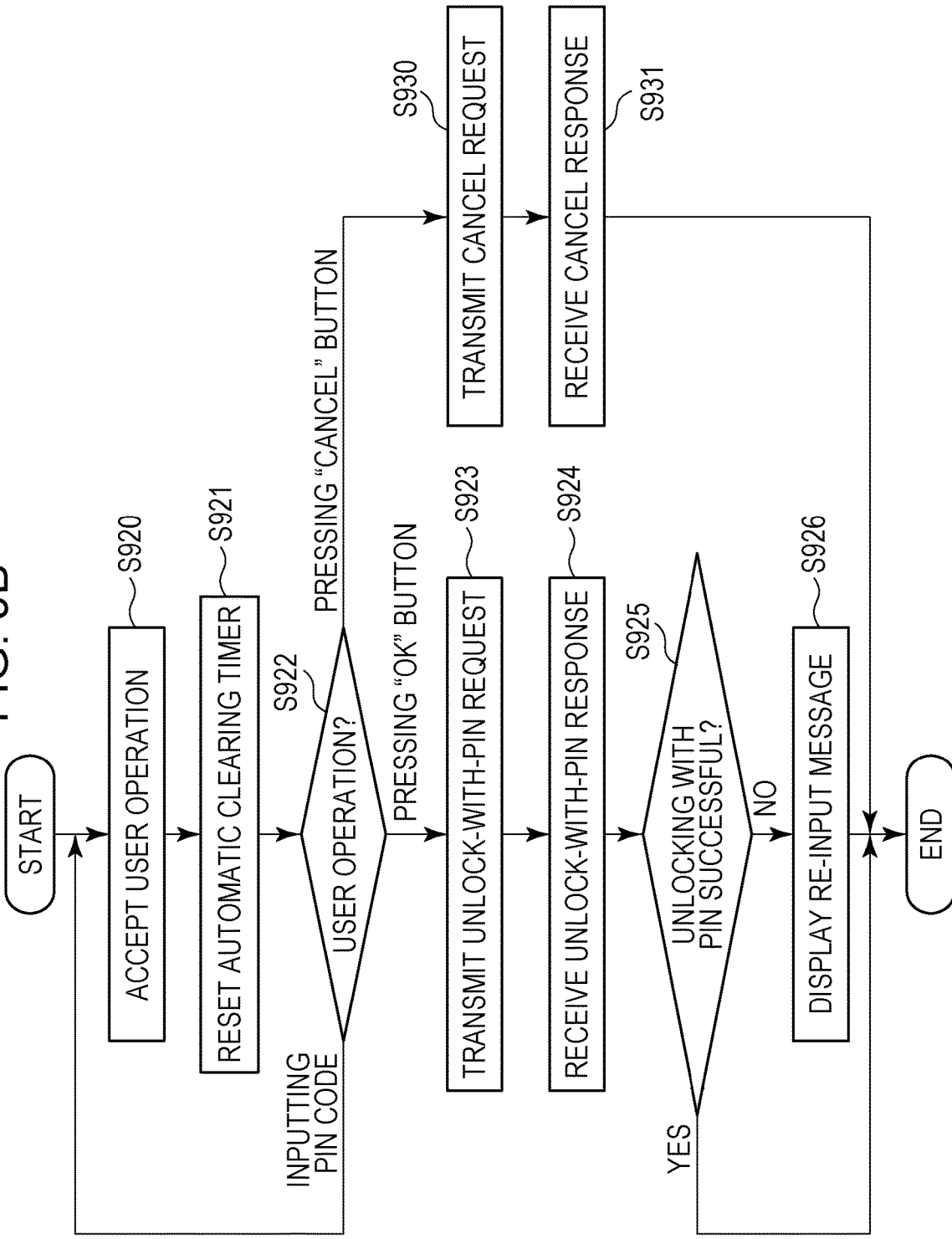

With reference to FIGS. 9A and 9B, processes performed in a case where user operations are performed on the application 401 will be described. FIGS. 9A and 9B are flowcharts for explaining processes performed in the data processing apparatus 101, and the processes are implemented by the CPU 202 of the data processing apparatus 101 loading a program for implementing a control module stored in the ROM 203 or the storage device 209 to the RAM 204 and executing the program. The processes in the flowcharts illustrated in FIGS. 9A and 9B are performed asynchronously to the process in the flowchart illustrated in FIG. 7.

FIG. 9A is a flowchart for explaining a process performed in a case where a user operation is performed on the original-document placing screen (FIG. 8B) displayed in step S712.

In step S901, the UI control unit 402 accepts a user operation performed on the original-document placing screen and the process proceeds to the next step.

In step S902, the UI control unit 402 resets the automatic clearing timer of the data processing apparatus 101. In step S903, the UI control unit 402 determines the user operation detected in step S901. The UI control unit 402 makes the process proceed to step S904 if the user operation is pressing of the placing completed button 823, or makes the process proceed to step S910 if the user operation is pressing of the cancel button 822.

In step S904, the MFP control unit 403 transmits to the image forming apparatus 104 an original-document placing request for giving a notification that an original document has been placed. In step S905, the MFP control unit 403 receives from the image forming apparatus 104 an original-document placing response as a response to the request transmitted in step S904 and ends the process in the flowchart.

In step S910, the MFP control unit 403 transmits to the image forming apparatus 104 a cancel request for canceling the cooperation state. In step S911, the MFP control unit 403 receives a cancel response from the image forming apparatus 104 as a response to the request transmitted in step S910 and ends the process in the flowchart.

FIG. 9B is a flowchart for explaining a process performed in a case where a user operation is performed on the PIN code input screen (FIG. 8C) displayed in step S720.

In step S920, the UI control unit 402 accepts a user operation performed on the PIN code input screen, and the process proceeds to the next step.

In step S921, the UI control unit 402 resets the automatic clearing timer of the data processing apparatus 101. In step S922, the UI control unit 402 determines the user operation accepted in step S920. The UI control unit 402 makes the process return to step S920 if the user operation is input of a PIN code, makes the process proceed to step S923 if the user operation is pressing of the OK button 833, or makes the process proceed to step S930 if the user operation is pressing of the cancel button 832.

In step S923, the MFP control unit 403 transmits to the image forming apparatus 104 an unlock-with-PIN request for unlocking with the PIN code. The unlock-with-PIN request includes the PIN code input into the PIN code input field 831 by the user. In step S924, the MFP control unit 403 receives an unlock-with-PIN response from the image forming apparatus 104 as a response to the request transmitted in step S923. The unlock-with-PIN response includes information about whether unlocking with the PIN code is successful. In step S925, the MFP control unit 403 ends the process in the flowchart if unlocking with the PIN code is successful or makes the process proceed to step S926 if unlocking with the PIN code fails. In step S926, the UI control unit 402 displays a message saying that unlocking with the PIN code fails and prompting the user to re-input a PIN code into a message area (PIN code input field 831), and ends the process in the flowchart.

In step S930, the MFP control unit 403 transmits to the image forming apparatus 104 a cancel request for canceling the cooperation state. In step S931, the MFP control unit 403 receives a cancel response from the image forming apparatus 104 as a response to the request transmitted in step S930 and ends the process in the flowchart.

With reference to FIG. 10, a process for automatic clearing control in the data processing apparatus 101 will be described. FIG. 10 is a flowchart for explaining a process performed by the data processing apparatus 101, and the process is implemented by the CPU 202 of the data processing apparatus 101 loading a program for implementing a control module stored in the ROM 203 or the storage device 209 to the RAM 204 and executing the program. The process in the flowchart illustrated in FIG. 10 is performed asynchronously to the process in the flowchart illustrated in FIG. 7 and to the processes in the flowcharts illustrated in FIGS. 9A and 9B.

Note that in this embodiment, an example case where the menu screen of the application 401 is displayed in response to the occurrence of automatic clearing in the data processing apparatus 101 will be described. However, this embodiment is not limited to this, and the home screen of the data processing apparatus 101 may be displayed or the data processing apparatus 101 may be locked in a case where the data processing apparatus 101 is a mobile terminal.

In step S1001, the UI control unit 402 detects the application 401 being called and displayed on the display 214. In step S1002, the UI control unit 402 starts counting down by the automatic clearing timer. Thereafter, the automatic clearing timer decreases the remaining time as time passes.

In step S1003, the UI control unit 402 monitors the remaining time of the automatic clearing timer, and makes the process proceed to step S1004 when detecting the remaining time being equal to zero or keeps monitoring the remaining time if the remaining time is more than zero.

In step S1004, the UI control unit 402 displays the menu screen 851 of the data processing apparatus 101 and ends the process in the flowchart.

With the process in the flowchart described above, an automatic clearing process is performed when a predetermined time elapses in a state in which a predetermined condition is satisfied. Although an example of counting down has been described here, counting up may be performed and automatic clearing may be made to occur when the count reaches a predetermined count.

Figure 11A:
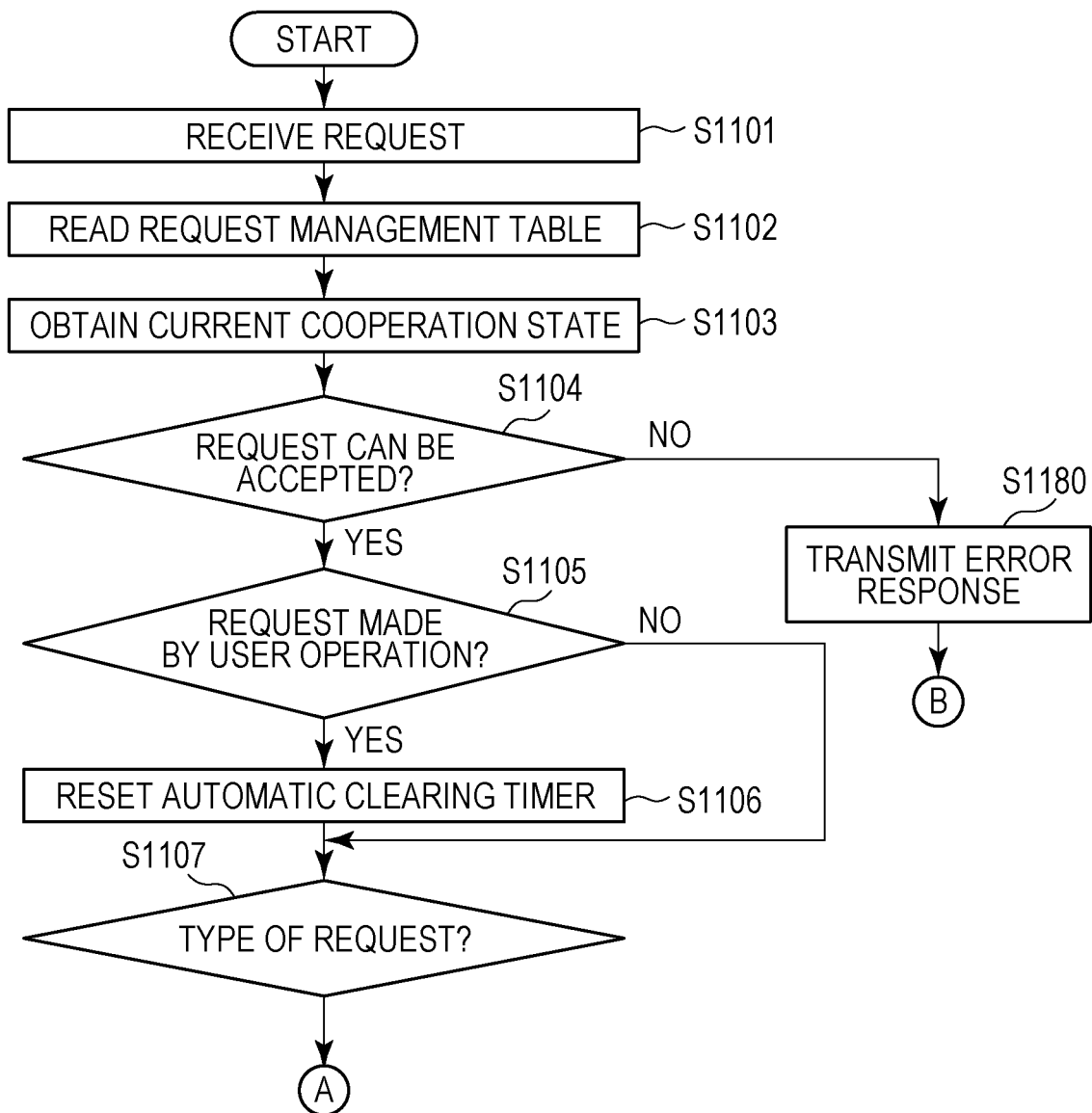

With reference to FIGS. 11A and 11B and FIG. 12, a cooperation process that is performed by the image forming apparatus 104 of this embodiment with the data processing apparatus 101 will be described. FIGS. 11A and 11B illustrate a flowchart for explaining the cooperation process in the image forming apparatus 104, and the process is implemented by the CPU 302 of the image forming apparatus 104 loading a program for implementing a control module stored in the ROM 304 or the HDD 305 to the RAM 303 and executing the program.

In step S1101, the cooperation control unit 503 receives over the network 103 a request transmitted from the data processing apparatus 101. This request is, for example, information transmitted in step S704 or step S707.

In step S1102, the cooperation control unit 503 obtains from the request management table 600 information (information defined in the "cooperation state for acceptance" column 602 and in the "user-operation-causing request" column 603) corresponding to the request received in step S1101.

In step S1103, the cooperation control unit 503 obtains the current cooperation state of the image forming apparatus 104. In step S1104, the cooperation control unit 503 determines whether the request received in step S1101 is a request that can be accepted in the current cooperation state. Specifically, the cooperation control unit 503 determines whether the current cooperation state satisfies the value in the "cooperation state for acceptance" column 602 obtained in step S1102. If the request is a request that can be accepted, the cooperation control unit 503 makes the process proceed to step S1105; otherwise the cooperation control unit 503 makes the process proceed to step S1180.

In step S1105, the cooperation control unit 503 determines whether the request received in step S1101 is a request made by a user operation. Specifically, the cooperation control unit 503 performs determination on the basis of whether the value in the "user-operation-causing request" column 603 obtained in step S1102 is "YES" or "NO". Performing determination based on the value in the "user-operation-causing request" column 603 as to whether the request is a request made by a user operation is an example, and other methods may be used. For example, a request transmitted by the data processing apparatus 101 may include information indicating whether the request is a request made by a user operation, and determination may be performed on the basis of the information. If the request is a request made by a user operation, the cooperation control unit 503 makes the process proceed to step S1106; otherwise the cooperation control unit 503 makes the process proceed to step S1107.

In step S1106, the UI control unit 502 resets the automatic clearing timer of the image forming apparatus 104.

In step S1107, the cooperation control unit 503 makes the process diverge in accordance with the type of the request received in step S1101. If the request is a "job execution request", the cooperation control unit 503 makes the process proceed to step S1108. If the request is an "original-document placing request", the cooperation control unit 503 makes the process proceed to step S1120. If the request is a "cancel request", the cooperation control unit 503 makes the process proceed to step S1130. If the request is an "unlock-with-PIN request", the cooperation control unit 503 makes the process proceed to step S1140. If the request is a "cooperation state obtaining request", the cooperation control unit 503 makes the process proceed to step S1170.

In step S1108, the cooperation control unit 503 saves job information included in the job execution request received in step S1101 in the RAM 303. The cooperation control unit 503 retains the saved job information until the cooperation state is canceled. In step S1109, the cooperation control unit 503 determines the original-document detection state of the scanner 313 of the image forming apparatus 104. If the original-document detection state of the scanner 313 is a state in which a placed original document is detected, the cooperation control unit 503 makes the process proceed to step S1120; otherwise the cooperation control unit 503 makes the process proceed to step S1110.

In step S1110, the cooperation control unit 503 changes the cooperation state to the "waiting for an original document to be placed" state.

In step S1111, the UI control unit 502 displays the original-document placing screen (FIG. 12D) on the operation unit 307 of the image forming apparatus 104, and subsequently, makes the process proceed to step S1150. The original-document placing screen is a screen for displaying a message for prompting the user to place an original document on the scanner 313. A process that is performed in a case where a user operation is performed on the original-document placing screen will be described with reference to the flowchart in FIG. 13.

In step S1120, the cooperation control unit 503 changes the cooperation state to the "PIN code request" state. In step S1121, the cooperation control unit 503 generates a PIN code. Although the PIN code may be generated in any manner, in this embodiment, for example, a four-digit number generated at random may be used as the PIN code. In step S1122, the UI control unit 502 displays the PIN code screen (FIG. 12E) on the operation unit 307 of the image forming apparatus 104, and subsequently, makes the process proceed to step S1150. The PIN code screen is a screen for presenting to the user the PIN code generated in step S1121. A process that is performed in a case where a user operation is performed on the PIN code screen will be described with reference to the flowchart in FIG. 13.

In step S1130, the cooperation control unit 503 changes the cooperation state to the "cancel" state. In step S1131, the cooperation control unit 503 sets a timer for canceling the cooperation state, and subsequently, makes the process proceed to step S1150. After the elapse of the time set for the timer, the cooperation control unit 503 deletes the cooperation state and the job settings saved in step S1108, and the image forming apparatus 104 transitions to the "not in cooperation" state.

In step S1140, the cooperation control unit 503 determines whether a PIN code included in the unlock-with-PIN request received in step S1101 matches with the PIN code generated in step S1121. If the PIN codes match, the cooperation control unit 503 makes the process proceed to step S1141; otherwise the cooperation control unit 503 makes the process proceed to step S1160.

In step S1141, the cooperation control unit 503 changes the cooperation state to the "job execution" state. In step S1142, the cooperation control unit 503 requests the job control unit 505 to start executing the job by using the job settings saved in step S1108. Subsequently, the process proceeds to step S1150.

In step S1150, the cooperation control unit 503 transmits to the data processing apparatus 101 a response to the request received in step S1101 and ends the process in the flowchart. The response includes information indicating that the request is successfully accepted. For example, in a case where the request received in step S1101 is an unlock-with-PIN request, the unlock-with-PIN response includes information indicating that unlocking with the PIN code is successful.

In step S1160, the cooperation control unit 503 transmits to the data processing apparatus 101 as a response to the unlock-with-PIN request received in step S1101, an unlock-with-PIN response that includes information indicating that unlocking fails because the PIN code does not match, and ends the process in the flowchart.

In step S1170, the cooperation control unit 503 transmits to the data processing apparatus 101 as a response to the cooperation state obtaining request received in step S1101, a cooperation state obtaining response that includes information about the current cooperation state, and ends the process in the flowchart.

In step S1180, the cooperation control unit 503 transmits to the data processing apparatus 101 as a response to the request received in step S1101, an error response that includes information indicating that the request is not accepted, and ends the process in the flowchart.

With the process described above, the image forming apparatus 104 can reset the automatic clearing timer when accepting a request from the data processing apparatus 101 without the operation unit 307 accepting an operation. Therefore, for example, the PIN code screen (FIG. 12E) is not prevented from being displayed, and the user can make the process proceed. The automatic clearing timer is reset only in a case where an accepted request from the data processing apparatus 101 is a request based on an operation on the data processing apparatus 101, and therefore, the automatic clearing timer is not reset undesirably. For example, a cooperation state obtaining request is a request that is transmitted occasionally without the user operating the data processing apparatus 101, and therefore, when receiving this request, the image forming apparatus 104 does not reset the automatic clearing timer. The automatic clearing timer of the image forming apparatus 104 may be configured to reset each time one character of a PIN code is input on the data processing apparatus 101.

Figure 13:
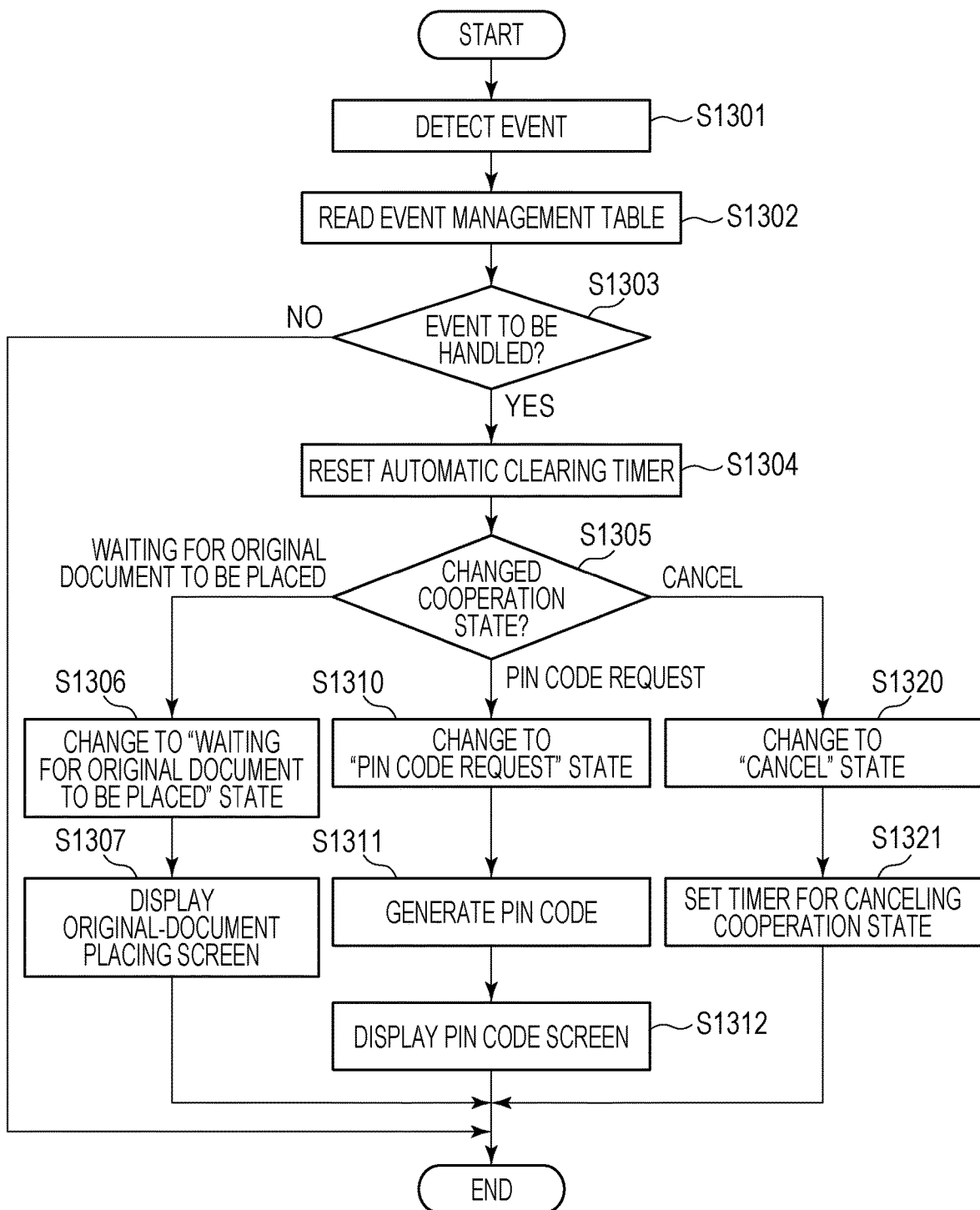
FIG. 13 is a flowchart illustrating a process performed by the image forming apparatus in the first embodiment.

With reference to FIG. 13, a process performed in a case where a user operation is performed on the image forming apparatus 104 will be described. FIG. 13 is a flowchart for explaining the process in the image forming apparatus 104, and the process is implemented by the CPU 302 of the image forming apparatus 104 loading a program for implementing a control module stored in the ROM 304 or the HDD 305 to the RAM 303 and executing the program. The process in the flowchart illustrated in FIG. 13 is performed asynchronously to the process in the flowchart illustrated in FIGS. 11A and 11B.

In step S1301, the cooperation control unit 503 detects an event occurring in the image forming apparatus 104. For example, when the user places an original document on the scanner 313, a "scanner: an original document placed" event occurs. When the user removes an original document from the scanner 313, a "scanner: no original document placed" event occurs. When the user presses the placing completed button 1233 in FIG. 12D, a "UI: the placing completed button pressed" event occurs. When the user presses the cancel button 1232 or the cancel button 1241, a "UI: the cancel button pressed" event occurs.

In step S1302, the cooperation control unit 503 obtains from the event management table 650 information (information defined in the "occurring event" column 652 and in the "changed cooperation state" column 653) corresponding to the current cooperation state.

In step S1303, the cooperation control unit 503 determines whether the event detected in step S1301 is an event that is to be handled in the current cooperation state. Specifically, the cooperation control unit 503 determines whether the event detected in step S1301 is included in the "occurring event" column 652 obtained in step S1302. If the event is an event to be handled, the cooperation control unit 503 makes the process proceed to step S1304; otherwise the cooperation control unit 503 ends the process in the flowchart.

In step S1304, the cooperation control unit 503 resets the automatic clearing timer of the image forming apparatus 104.

In step S1305, the cooperation control unit 503 makes the process diverge in accordance with the "changed cooperation state" column 653 obtained in step S1302. If the changed cooperation state is "waiting for an original document to be placed", the cooperation control unit 503 makes the process proceed to step S1306. If the changed cooperation state is "PIN code request", the cooperation control unit 503 makes the process proceed to step S1310. If the changed cooperation state is "cancel", the cooperation control unit 503 makes the process proceed to step S1320.

In step S1306, the cooperation control unit 503 changes the cooperation state to the "waiting for an original document to be placed" state. In step S1307, the UI control unit 502 displays the original-document placing screen on the operation unit 307 of the image forming apparatus 104 and ends the process in the flowchart.

In step S1310, the cooperation control unit 503 changes the cooperation state to the "PIN code request" state. In step S1311, the cooperation control unit 503 generates a PIN code. In step S1312, the UI control unit 502 displays the PIN code screen on the operation unit 307 of the image forming apparatus 104 and ends the process in the flowchart.

In step S1320, the cooperation control unit 503 changes the cooperation state to the "cancel" state. In step S1321, the cooperation control unit 503 sets a timer for canceling the cooperation state and ends the process in the flowchart. After the time set for the timer has elapsed, the cooperation control unit 503 deletes the cooperation state and the job settings saved in step S1108, and the image forming apparatus 104 transitions to the "not in cooperation" state.

Figure 14:
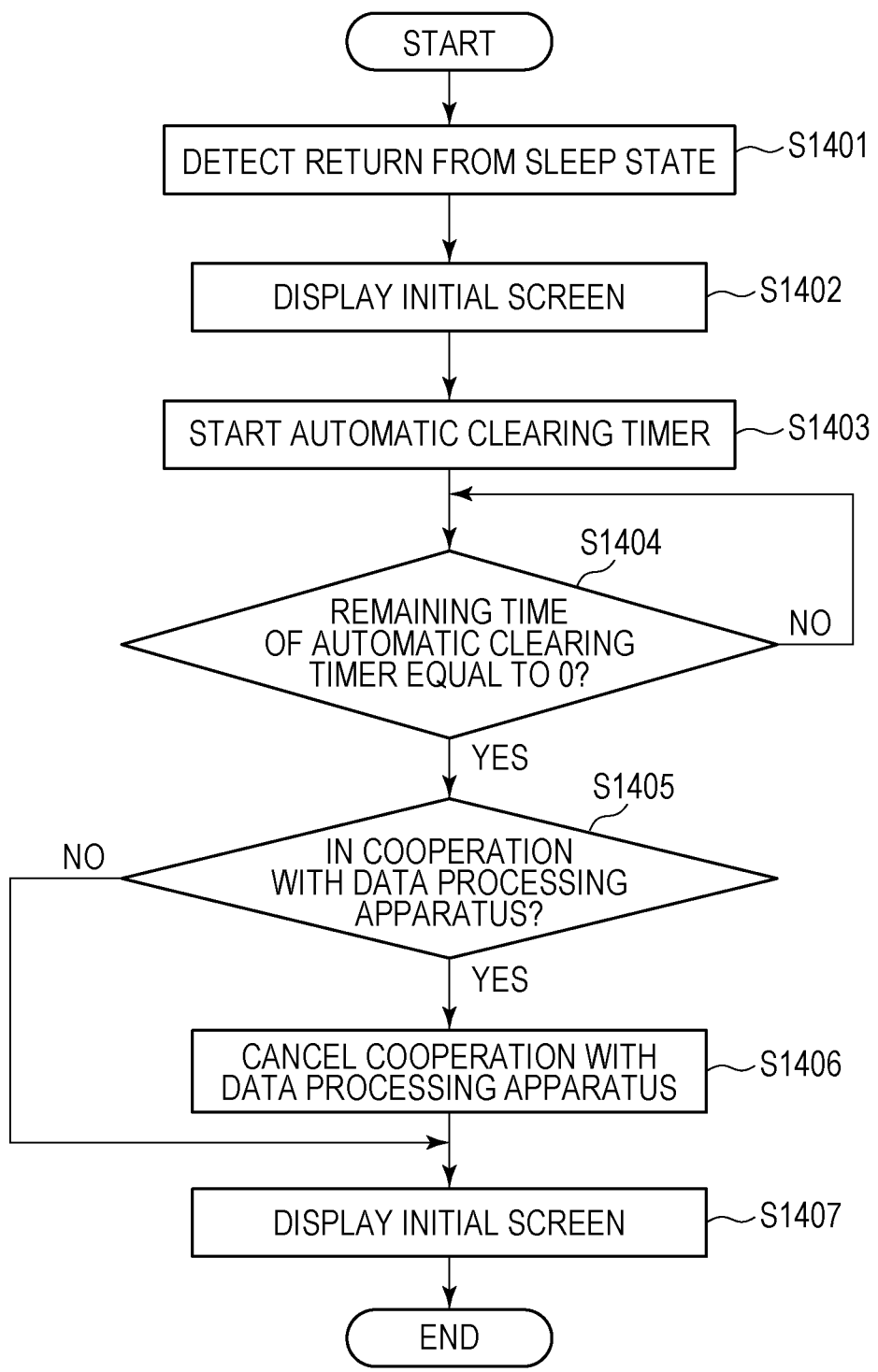
FIG. 14 is a flowchart illustrating a process performed by the image forming apparatus in the first embodiment.

With reference to FIG. 14, a process for automatic clearing control in the image forming apparatus 104 will be described. FIG. 14 is a flowchart for explaining the process in the image forming apparatus 104, and the process is implemented by the CPU 302 of the image forming apparatus 104 loading a program for implementing a control module stored in the ROM 304 or the HDD 305 to the RAM 303 and executing the program. The process in the flowchart illustrated in FIG. 14 is performed asynchronously to the processes in the flowcharts illustrated in FIGS. 11A and 11B and FIG. 13.

Note that in this embodiment, an example case where the initial screen of the image forming apparatus 104 is displayed in response to the occurrence of automatic clearing in the image forming apparatus 104 will be described. The initial screen can be set by the user, or the home screen (FIG. 12B) may be set or a specific application screen may be specified. The operation performed in response to the occurrence of automatic clearing is an example, and another example operation may be performed in which in a case where the image forming apparatus 104 has an authentication function, the user is made to log out of the image forming apparatus 104.

In step S1401, the UI control unit 502 detects the image forming apparatus 104 returning from a sleep state. The sleep state is a state in which only limited components are energized to reduce power consumption in a case where the image forming apparatus 104 is not used for a predetermined time. When the user operates the image forming apparatus 104, the image forming apparatus 104 returns from the sleep state and becomes ready for use. Although the time during which the image forming apparatus 104 is in the sleep state may be longer than the automatic clearing time or equal to the automatic clearing time, in this embodiment, a description will be given under the assumption that the time during which the image forming apparatus 104 is in the sleep state is longer than the automatic clearing time.

In step S1402, in response to the return from the sleep state, the UI control unit 502 displays the initial screen on the operation unit 307 of the image forming apparatus 104. In step S1403, the UI control unit 502 starts counting down by the automatic clearing timer. Thereafter, the automatic clearing timer decreases the remaining time as time passes.

In step S1404, the UI control unit 502 monitors the remaining time of the automatic clearing timer, and makes the process proceed to step S1405 when detecting the remaining time being equal to zero or keeps monitoring the remaining time if the remaining time is more than zero.

In step S1405, the cooperation control unit 503 determines whether the image forming apparatus 104 is in cooperation with the data processing apparatus 101 currently. If the image forming apparatus 104 is in cooperation with the data processing apparatus 101, the cooperation control unit 503 makes the process proceed to step S1406; otherwise the cooperation control unit 503 makes the process proceed to step S1407.

In step S1406, the cooperation control unit 503 deletes the cooperation state and the job settings saved in step S1108 and cancels cooperation with the data processing apparatus 101.

In step S1407, the UI control unit 502 displays the initial screen on the operation unit 307 of the image forming apparatus 104 and ends the process in the flowchart.

With the procedure described in this embodiment, in a case where a user operation is performed on either the data processing apparatus 101 or the image forming apparatus 104 while the data processing apparatus 101 and the image forming apparatus 104 are operating in cooperation with each other, the automatic clearing timers of both apparatuses are reset. Accordingly, the automatic clearing function appropriately works while the data processing apparatus 101 and the image forming apparatus 104 are operating in cooperation with each other, resulting in increased usability.

Second Embodiment

In the first embodiment, in a case where automatic clearing occurs in one of the data processing apparatus 101 or the image forming apparatus 104, automatic clearing is made to occur in the other apparatus in accordance with the automatic clearing time of the other apparatus. In a second embodiment, an example configuration in which in a case where automatic clearing occurs in one of the apparatuses, automatic clearing is made to occur also in the other apparatus will be described. The basic configuration of the second embodiment is the same as that of the first embodiment, and therefore, only differences will be described.

Figure 15:
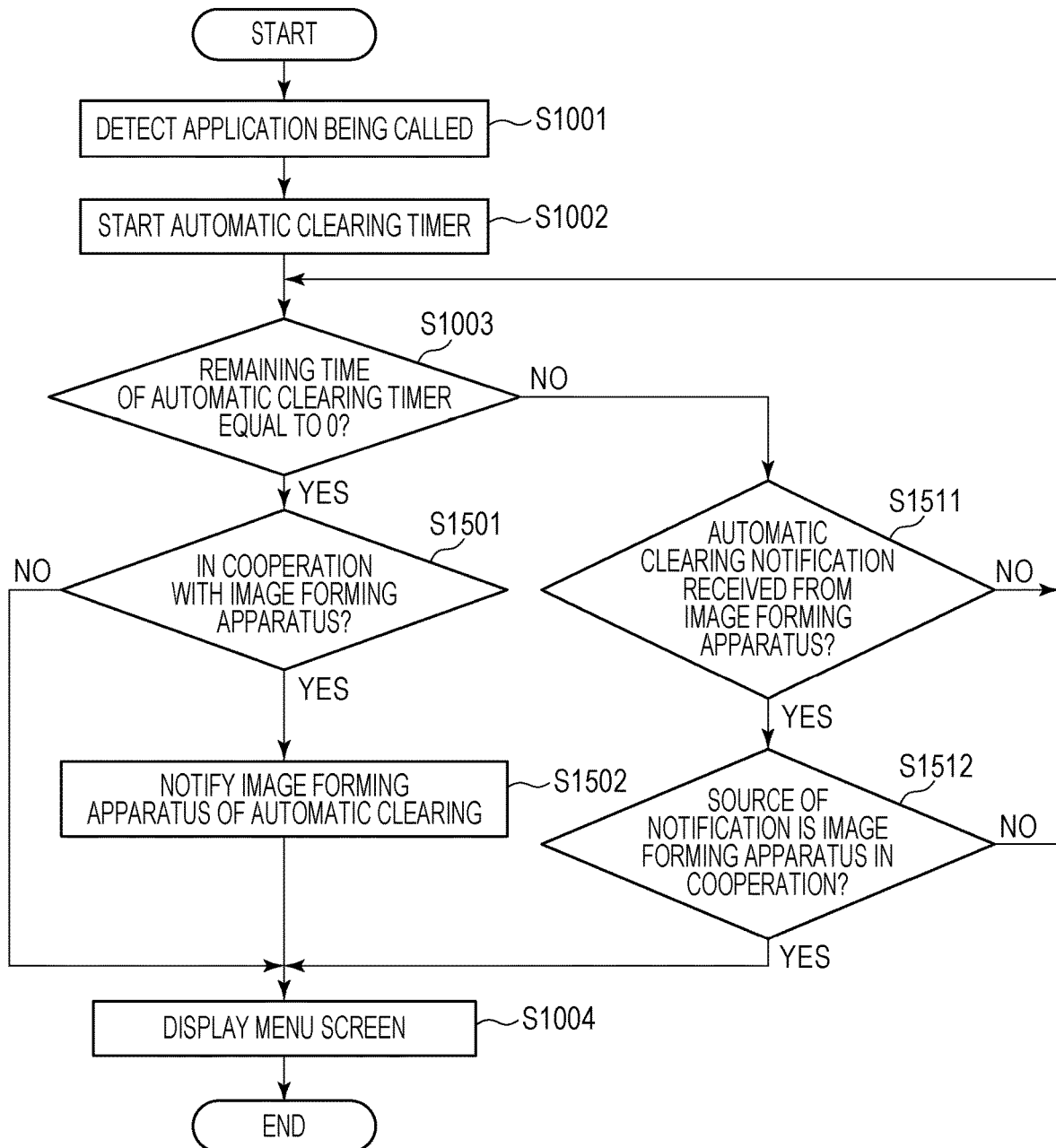
FIG. 15 is a flowchart illustrating a process performed by the data processing apparatus in a second embodiment.

With reference to FIG. 15, a process for automatic clearing control performed by the data processing apparatus 101 in the second embodiment will be described. FIG. 15 is a flowchart obtained by modifying the flowchart in FIG. 10. Only differences from FIG. 10 will be described.

In step S1501, the MFP control unit 403 determines whether the data processing apparatus 101 is in cooperation with the image forming apparatus 104. Although determination may be performed in any manner, for example, the cooperation state obtaining response received in step S708 may be retained, and the cooperation state may be used to perform determination.

Alternatively, determination may be performed on the basis of whether the screen currently displayed on the display 214 is a screen that is displayed during cooperation. If the data processing apparatus 101 is in cooperation with the image forming apparatus 104, the MFP control unit 403 makes the process proceed to step S1502; otherwise the MFP control unit 403 makes the process proceed to step S1004.

In step S1502, the MFP control unit 403 transmits to the image forming apparatus 104 a notification of the occurrence of automatic clearing.

In step S1511, the MFP control unit 403 determines whether a notification of the occurrence of automatic clearing is received from the image forming apparatus 104. The MFP control unit 403 makes the process proceed to step S1512 if the notification is received, or makes the process return to step S1003 if the notification is not received.

In step S1512, the MFP control unit 403 determines whether the notification received in step S1511 is a notification from the image forming apparatus 104 that is in cooperation with the data processing apparatus 101. If the source of the notification is the image forming apparatus 104, the MFP control unit 403 makes the process proceed to step S1004; otherwise the MFP control unit 403 makes the process return to step S1003.

Figure 16:
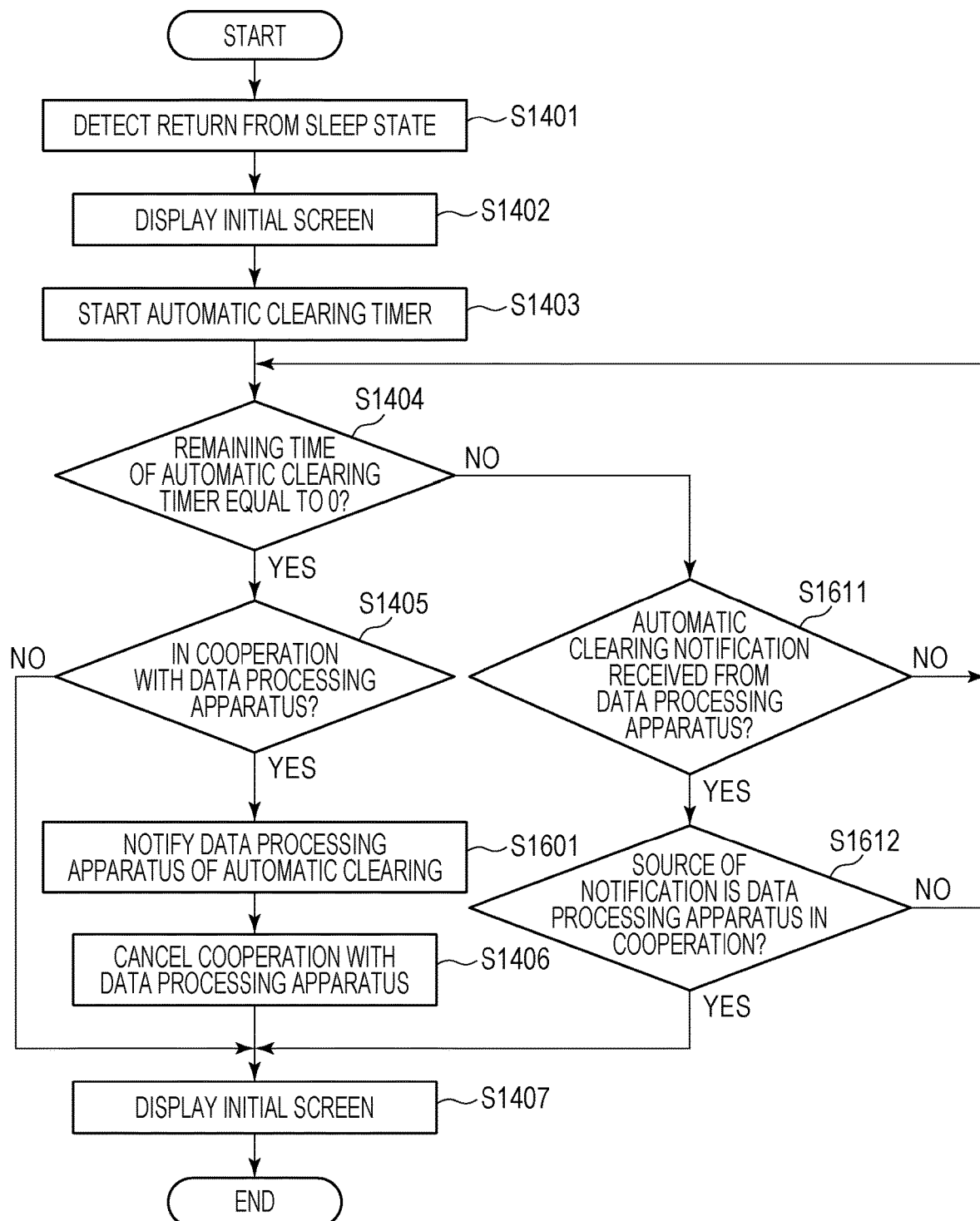
FIG. 16 is a flowchart illustrating a process performed by the image forming apparatus in the second embodiment.

With reference to FIG. 16, a process for automatic clearing control performed by the image forming apparatus 104 in the second embodiment will be described. FIG. 16 is a flowchart obtained by modifying the flowchart in FIG. 14. Only differences from FIG. 14 will be described.

In step S1601, the cooperation control unit 503 transmits to the data processing apparatus 101 a notification of the occurrence of automatic clearing.

In step S1611, the cooperation control unit 503 determines whether a notification of the occurrence of automatic clearing is received from the data processing apparatus 101. The cooperation control unit 503 makes the process proceed to step S1612 if the notification is received, or makes the process return to step S1404 if the notification is not received.

In step S1612, the cooperation control unit 503 determines whether the notification received in step S1611 is a notification from the data processing apparatus 101 that is in cooperation with the image forming apparatus 104. If the source of the notification is the data processing apparatus 101, the cooperation control unit 503 makes the process proceed to step S1407; otherwise the cooperation control unit 503 makes the process return to step S1404.

As described above, according to the second embodiment, in a case where automatic clearing occurs in one of the apparatuses, a notification of the automatic clearing is transmitted to the other apparatus, and this can make automatic clearing occur in both apparatuses that are in cooperation, resulting in increased usability.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to embodiments, it is to be understood that the invention is not limited to the disclosed embodiments, but is defined by the scope of the following claims.

This application claims the benefit of Japanese Patent Application No. 2021-161001 filed Sep. 30, 2021, which is hereby incorporated by reference herein in its entirety.

What is claimed is:

1. An information processing apparatus configured to be capable of communicating with a terminal, the information processing apparatus including an operation unit, the information processing apparatus comprising:
a counting unit configured to count a time during which no user operation on the operation unit of the information processing apparatus is accepted;
a performing unit configured to perform an automatic clearing process in a case where a predetermined time is counted by the counting unit; and
a resetting unit configured to reset the time, during which no user operation on the operation unit of the information processing apparatus is accepted, counted by the counting unit based on information based on a user operation accepted on an operation unit of the terminal different from the operation unit of the information processing apparatus even if the user operation is accepted on the operation unit of the terminal.

2. The information processing apparatus according to claim 1, wherein the reset unit resets the time counted by the counting unit in a case where the information based on the user operation accepted on the operation unit of the terminal is transmitted from the terminal.

3. The information processing apparatus according to claim 1, further comprising
a receiving unit configured to receive from the terminal, job information for executing a function of the information processing apparatus,
wherein the information based on the user operation accepted on the operation unit of the terminal is information for executing a job based on the job information.

4. The information processing apparatus according to claim 1, wherein the automatic clearing process includes a process of displaying an initial screen.

5. The information processing apparatus according to claim 1, wherein the automatic clearing process includes a process of clearing a value of a setting set on a displayed screen.

6. The information processing apparatus according to claim 1, wherein the automatic clearing process includes a process of making a logged-in user of the information processing apparatus log out of the information processing apparatus.

7. The information processing apparatus according to claim 1, wherein the information processing apparatus is an image forming apparatus having at least one of a print function, a scan function, or a copy function.

8. The information processing apparatus according to claim 1, wherein the performing unit is configured to perform the automatic clearing process in the information processing apparatus based on an automatic clearing process in the terminal.

9. The information processing apparatus according to claim 1, wherein the resetting unit is configured to operate based on job information for executing a function of the information processing apparatus received from the terminal.

10. An information processing system including a terminal and an information processing apparatus including an operation unit, the information processing system comprising:
a performing unit configured to perform an automatic clearing process in the information processing apparatus in response to a predetermined time counted in a state in which a predetermined condition is satisfied,
wherein the predetermined condition includes a condition that no user operation on the operation unit of the information processing apparatus is accepted, and
wherein the time counted is reset based on information based on a user operation accepted on an operation unit of the terminal different from the operation unit of the information processing apparatus even if the user operation is accepted on the operation unit of the terminal.

11. A method for an information processing apparatus configured to be capable of communicating with a terminal, the information processing apparatus including an operation unit,
the method comprising:
counting a time during which no user operation on the operation unit of the information processing apparatus is accepted;
performing an automatic clearing process in a case where a predetermined time is counted in the counting; and
resetting the time, during which no user operation on the operation unit of the information processing apparatus is accepted, counted in the counting based on information based on a user operation accepted on an operation unit of the terminal different from the operation unit of the information processing apparatus even if the user operation is accepted on the operation unit of the terminal.

12. The method according to claim 11, wherein the resetting resets the time counted in the counting in a case where the information based on the user operation accepted on the operation unit of the terminal is transmitted from the terminal.

13. The method according to claim 11, further comprising receiving from the terminal, job information for executing a function of the information processing apparatus,
wherein the information based on the user operation accepted on the operation unit of the terminal is information for executing a job based on the job information.

14. The method according to claim 11, wherein the automatic clearing process includes a process of displaying an initial screen.

15. The method according to claim 11, wherein the automatic clearing process includes a process of clearing a value of a setting set on a displayed screen.

16. The method according to claim 11, wherein the automatic clearing process includes a process of making a logged-in user of the information processing apparatus log out of the information processing apparatus.

17. The method according to claim 11, wherein the information processing apparatus is an image forming apparatus having at least one of a print function, a scan function, or a copy function.

18. The method according to claim 11, further comprising performing the automatic clearing process in the information processing apparatus based on an automatic clearing process in the terminal.

19. The method according to claim 11, wherein resetting the time in response to a predetermined request received from the terminal is carried out based on job information for executing a function of the information processing apparatus received from the terminal.

* * * * *